(12) United States Patent
Salonen

(10) Patent No.: US 9,171,307 B2
(45) Date of Patent: Oct. 27, 2015

(54) USING SUCCESSIVE LEVELS OF AUTHENTICATION IN ONLINE COMMERCE

(71) Applicant: BOOKIT OY AJANVARAUSPALVELU, Helsinki (FI)

(72) Inventor: Jukka Salonen, Luhtajoki (FI)

(73) Assignee: BOOKIT OY AJANVARAUSPALVELU, Helsinki (FI)

( * ) Notice: Subject to any disclaimer, the term of this patent is extended or adjusted under 35 U.S.C. 154(b) by 0 days.

(21) Appl. No.: 14/179,468

(22) Filed: Feb. 12, 2014

(65) Prior Publication Data
US 2014/0164269 A1 Jun. 12, 2014

Related U.S. Application Data

(63) Continuation-in-part of application No. 12/944,749, filed on Nov. 12, 2010, now Pat. No. 8,666,380, which
(Continued)

(51) Int. Cl.
*H04M 3/42* (2006.01)
*G06Q 30/00* (2012.01)
(Continued)

(52) U.S. Cl.
CPC ............ *G06Q 30/0185* (2013.01); *G06Q 10/02* (2013.01); *G06Q 10/109* (2013.01);
(Continued)

(58) Field of Classification Search
CPC ........... H04W 4/12; H04W 4/14; H04W 4/24; H04W 4/26; H04W 8/00; H04W 12/00; H04W 12/06; H04W 12/08; H04W 12/12

USPC .......... 455/412.1, 412.2, 414.1, 414.2, 414.4, 455/415, 417, 466, 424, 445, 410, 411; 705/1, 3, 4, 5, 6; 709/220, 221, 222, 709/224, 245, 227
See application file for complete search history.

(56) References Cited

U.S. PATENT DOCUMENTS

| | | | |
|---|---|---|---|
| 5,592,666 A | 1/1997 | Perez | |
| 5,838,965 A | 11/1998 | Kavanaagh et al. | |

(Continued)

FOREIGN PATENT DOCUMENTS

| | | |
|---|---|---|
| CN | 1675637 | 10/2002 |
| EP | 0881802 | 2/1998 |

(Continued)

OTHER PUBLICATIONS

Bmd wireless AG, Wireless Application messaging server, 2004.
(Continued)

*Primary Examiner* — Jean Gelin
(74) *Attorney, Agent, or Firm* — Barnes & Thornburg LLP

(57) ABSTRACT

A method comprising performing following acts on a network server: receiving a communication from a client terminal operated by a client; performing a first authentication of the client terminal or client; in response to the first authentication, delivering a first service to the client; after delivering the first service, sending an offer for a second service to the client terminal; receiving an acceptance message for the second service from the client terminal; performing a second authentication of the client terminal and/or the client; in response to receiving the acceptance message for the second service from the client terminal and to the second authentication being successful, delivering a second service to the client; wherein the first authentication and the second authentication use different authentication techniques. Other aspects include a programmed data processing apparatus for carrying out the method and a tangible program carrier instructing the apparatus to perform the acts.

25 Claims, 16 Drawing Sheets

Related U.S. Application Data is a continuation-in-part of application No. 11/980,470, filed on Oct. 31, 2007, now Pat. No. 8,050,664, which is a continuation of application No. 10/227,194, filed on Aug. 21, 2002, now Pat. No. 7,406,429, application No. 14/179,468, which is a continuation-in-part of application No. 13/002,512, filed as application No. PCT/FI2009/050611 on Jul. 3, 2009, now Pat. No. 8,825,774, application No. 14/179,468, which is a continuation-in-part of application No. 13/074,037, filed on Mar. 29, 2011, which is a continuation-in-part of application No. 10/734,352, filed on Dec. 11, 2003, which is a continuation of application No. 10/227,194, application No. 14/179,468, which is a continuation-in-part of application No. 13/039,338, filed on Mar. 3, 2011, now Pat. No. 8,634,522, which is a continuation of application No. 11/885,748, filed as application No. PCT/FI2006/050517 on Nov. 27, 2006, now Pat. No. 7,912,190, application No. 14/179,468, which is a continuation-in-part of application No. 12/972,610, filed on Dec. 20, 2010, which is a continuation of application No. 11/980,470, which is a continuation of application No. 10/227,194, application No. 14/179,468, which is a continuation-in-part of application No. 12/958,870, filed on Dec. 2, 2010, which is a continuation-in-part of application No. 11/980,470, which is a continuation of application No. 10/227,194, application No. 14/179,468, which is a continuation-in-part of application No. 12/401,392, filed on Mar. 10, 2009, and a continuation-in-part of application No. 13/332,409, filed on Dec. 21, 2011, and a continuation-in-part of application No. 13/452,229, filed on Apr. 20, 2012, now Pat. No. 8,737,958, and a continuation-in-part of application No. 13/452,311, filed on Apr. 20, 2012, now Pat. No. 8,737,954, and a continuation-in-part of application No. 13/514,980, filed as application No. PCT/IB2010/003467 on Dec. 10, 2010, now abandoned, application No. 14/179,468, which is a continuation-in-part of application No. 13/529,737, filed on Jun. 21, 2012, now Pat. No. 8,737,955, and a continuation-in-part of application No. 13/529,776, filed on Jun. 21, 2012, now Pat. No. 8,737,959, and a continuation-in-part of application No. 13/800,641, filed on Mar. 13, 2013.

(60) Provisional application No. 61/318,648, filed on Mar. 29, 2010, provisional application No. 61/285,532, filed on Dec. 10, 2009, provisional application No. 61/764,194, filed on Feb. 13, 2013, provisional application No. 61/765,222, filed on Feb. 15, 2013.

(51) Int. Cl.
    *G06Q 10/02*     (2012.01)
    *G06Q 10/10*     (2012.01)
    *H04W 12/06*     (2009.01)
    *H04W 12/00*     (2009.01)
    *H04W 12/04*     (2009.01)
    *H04L 12/58*     (2006.01)

(52) U.S. Cl.
    CPC ........... *H04M3/42382* (2013.01); *H04L 51/28* (2013.01); *H04W 12/00* (2013.01); *H04W 12/04* (2013.01); *H04W 12/06* (2013.01)

(56) References Cited

U.S. PATENT DOCUMENTS

| | | |
|---|---|---|
| 5,940,818 A | 8/1999 | Malloy et al. |
| 5,987,467 A | 11/1999 | Ross et al. |
| 6,003,036 A | 12/1999 | Martin |
| 6,047,270 A | 4/2000 | Joao et al. |
| 6,085,100 A | 7/2000 | Tarnanen |
| 6,104,870 A | 8/2000 | Frick et al. |
| 6,199,076 B1 | 3/2001 | Logan et al. |
| 6,236,968 B1 | 5/2001 | Kanevsky et al. |
| 6,539,360 B1 | 3/2003 | Kadaba |
| 6,560,456 B1 | 5/2003 | Lohtia et al. |
| 6,564,261 B1 | 5/2003 | Gudjonsson et al. |
| 6,625,461 B1 | 9/2003 | Bertacchi |
| 6,639,919 B2 * | 10/2003 | Kroninger et al. ............ 370/464 |
| 6,772,336 B1 | 8/2004 | Dixon, Jr. |
| 6,873,688 B1 | 3/2005 | Aarnio |
| 6,990,332 B2 | 1/2006 | Vihinen |
| 7,149,537 B1 | 12/2006 | Kupsh et al. |
| 7,154,060 B2 | 12/2006 | Rosenbaum et al. |
| 7,222,081 B1 | 5/2007 | Sone |
| 7,406,429 B2 | 7/2008 | Salonen |
| 7,451,118 B2 | 11/2008 | McMeen et al. |
| 7,610,208 B2 | 10/2009 | Salonen |
| 7,610,224 B2 | 10/2009 | Spiegel |
| 7,615,984 B2 | 11/2009 | Kuwabara |
| 7,619,584 B2 | 11/2009 | Wolf |
| 7,660,397 B2 | 2/2010 | Heen et al. |
| 7,996,023 B2 | 8/2011 | McGary et al. |
| 8,050,664 B2 | 11/2011 | Salonen |
| 8,359,242 B2 | 1/2013 | Guillot |
| 2001/0037264 A1 | 11/2001 | Husemann et al. |
| 2001/0049785 A1 | 12/2001 | Kawan et al. |
| 2002/0028686 A1 | 3/2002 | Kagi |
| 2002/0032589 A1 | 3/2002 | Shah |
| 2002/0035539 A1 | 3/2002 | O'Connell |
| 2002/0059146 A1 | 5/2002 | Keech |
| 2002/0080822 A1 | 6/2002 | Brown et al. |
| 2002/0104007 A1 | 8/2002 | Moodie et al. |
| 2002/0111914 A1 | 8/2002 | Terada et al. |
| 2002/0116333 A1 * | 8/2002 | McDonnell et al. ............ 705/40 |
| 2002/0165000 A1 | 11/2002 | Fok |
| 2002/0173319 A1 | 11/2002 | Fostick |
| 2002/0180696 A1 | 12/2002 | Maritzen et al. |
| 2002/0184509 A1 | 12/2002 | Scheidt et al. |
| 2002/0188562 A1 | 12/2002 | Igarashi et al. |
| 2002/0191795 A1 | 12/2002 | Wills |
| 2003/0005126 A1 | 1/2003 | Schwartz et al. |
| 2003/0028782 A1 * | 2/2003 | Grundfest ..................... 713/182 |
| 2003/0051170 A1 * | 3/2003 | Spearman ..................... 713/201 |
| 2003/0101071 A1 | 5/2003 | Salonen |
| 2003/0163536 A1 | 8/2003 | Pettine, Jr. |
| 2003/0211844 A1 | 11/2003 | Omori |
| 2004/0097247 A1 | 5/2004 | Vilkuna et al. |
| 2004/0128158 A1 | 7/2004 | Salonen |
| 2004/0128173 A1 | 7/2004 | Salonen |
| 2004/0139318 A1 | 7/2004 | Fiala et al. |
| 2004/0157628 A1 | 8/2004 | Daniel et al. |
| 2004/0185883 A1 | 9/2004 | Rukman |
| 2004/0198322 A1 | 10/2004 | Mercer |
| 2005/0027608 A1 | 2/2005 | Wiesmuller et al. |
| 2005/0044042 A1 | 2/2005 | Mendiola et al. |
| 2005/0054286 A1 | 3/2005 | Kanjilal et al. |
| 2005/0065995 A1 | 3/2005 | Milstein et al. |
| 2005/0102230 A1 | 5/2005 | Haidar |
| 2005/0171738 A1 | 8/2005 | Kadaba |
| 2005/0246209 A1 | 11/2005 | Salonen |
| 2005/0268107 A1 | 12/2005 | Harris et al. |
| 2006/0010085 A1 | 1/2006 | McMeen et al. |
| 2006/0040682 A1 | 2/2006 | Goertz et al. |
| 2006/0075139 A1 | 4/2006 | Jungck |
| 2006/0131385 A1 | 6/2006 | Kim |
| 2006/0168064 A1 | 7/2006 | Huynh et al. |

(56) References Cited

U.S. PATENT DOCUMENTS

| | | |
|---|---|---|
| 2006/0224407 A1 | 10/2006 | Mills |
| 2006/0271551 A1 | 11/2006 | Suojasto |
| 2007/0010266 A1 | 1/2007 | Chaudhuri |
| 2007/0047533 A1 | 3/2007 | Criddle et al. |
| 2007/0123246 A1 | 5/2007 | Daniel et al. |
| 2007/0135101 A1 | 6/2007 | Ramati et al. |
| 2007/0143230 A1 | 6/2007 | Narainsamy et al. |
| 2007/0288215 A1 | 12/2007 | Goldman |
| 2008/0147408 A1 | 6/2008 | Da Palma et al. |
| 2008/0285475 A1 | 11/2008 | Menditto |
| 2008/0317224 A1 | 12/2008 | Salonen |
| 2009/0264100 A1 | 10/2009 | Sapir et al. |
| 2009/0281929 A1 | 11/2009 | Boitet et al. |
| 2010/0030689 A1 | 2/2010 | Ramos et al. |

FOREIGN PATENT DOCUMENTS

| | | |
|---|---|---|
| EP | 0967754 | 12/1999 |
| EP | 1065899 | 1/2001 |
| EP | 1458201 | 9/2004 |
| EP | 1546938 | 9/2010 |
| FI | 20011680 | 2/2003 |
| FI | 117663 | 12/2006 |
| FI | 20060387 | 10/2007 |
| FI | 118586 | 12/2007 |
| GB | 2391646 | 11/2004 |
| GB | 2435565 | 8/2007 |
| KR | 2004/013261 | 2/2004 |
| WO | WO 01/13299 | 2/2001 |
| WO | WO 02/067602 | 8/2002 |
| WO | WO 2004/019223 | 3/2004 |
| WO | WO 2006/122399 | 11/2006 |
| WO | WO 2007/063179 | 6/2007 |
| WO | WO 2007/122292 | 11/2007 |
| WO | WO 2007/125171 | 11/2007 |
| WO | WO 2008/017695 | 2/2008 |
| WO | WO 2010/000949 | 1/2010 |

OTHER PUBLICATIONS

Elisa Plc's press release Jun. 9, 2004, "Bookit Ltd and Elisa implement a handy mobile phone-enabled check-in service for Finnair", www.elisa.fi.

Elisa Plc's press release, "Innovative Solution Receives 2004 European Good Practice Award in occupational health and safety" and the appendix: BookIt case pdf. Nov. 22, 2004.

Empower Interactive Group Ltd., "Virtual Mobile Redirector"—Product Information Document, 2001.

Finish Search Report May 4, 2006.

Finish Search Report Jun. 3, 2009.

Finnair Plc's press release Jun. 9, 2004, "Finnair to introduce the world's easiest check-in—with a text message", www.bookit.netnews.

Jyrki Penttinen, GSM-tekniikka, WSOY, Provoo 1999, pp. 155-157, 222 & 331-332.

Kauppalehti, "Mobiilipalvelujen oltava yksinkertaisia: BookIt:n Jukka Salonen uskoo tavalisiin tekstiviesteihin," Heikki Nenonen, p. 19, published Jun. 9, 2005.

Mouly et al, "The GSM System for mobile Communications," Palaiseau 1992, pp. 556-560.

Press Release: Mobileway launches its Mobile Transaction Tracker solution, Jul. 11, 2002, San Ramon, CA.

TeliaSeonera Finland Oy, Development and Billing Manual, Version 1.0, Jan. 1, 2005, Content Gateway, Version 4.0, www.senera.fifiles-sonera.fi.

Verkkouutiset, "Sonera tarjoaa matakaviestinoperaattoreille Content Gateway-palvelualustaa", www.verkkouutiset.fi, Feb. 21, 2001.

* cited by examiner

USING SUCCESSIVE LEVELS OF AUTHENTICATION IN ONLINE COMMERCE

PARENT CASE INFORMATION

The present invention claims benefit from the following commonly owned earlier applications: 1) Ser. No. 12/944,749, title "Communication Method and System", filed Nov. 12, 2010, claiming priority from FI 20011680, filed Aug. 21, 2001; 2) Ser. No. 13/002,512, title "Method and System for Sending Messages", filed Jul. 3, 2009, claiming priority from FI 20085701, filed Jul. 4, 2008; 3) Ser. No. 13/074,037, title "Authentication Method and System", filed Mar. 29, 2011, claiming priority from FI 20011680, filed Aug. 21, 2001; 4) Ser. No. 13/039,338, title "Method and System for the Mass Sending of Messages", filed Mar. 3, 2011, claiming priority from FI 20051245, filed Dec. 2, 2005; 5) Ser. No. 12/972,610, title "Booking Method and System", filed Dec. 20, 2010, claiming priority from FI 20011680, filed Aug. 21, 2001; 6) Ser. No. 12/958,870, title "Communication Method and System", filed Dec. 2, 2010, claiming priority from FI 20011680, filed Aug. 21, 2001; 7) Ser. No. 12/401,392, title "Method and System for Delivery of Goods", filed Mar. 10, 2009; 8) Ser. No. 12/226,878, title "Method and System for Combining Text and Voice Messages in a Communications Dialogue", filed Apr. 26, 2007, claiming priority from FI 20060419, filed May 2, 2006; 9) Ser. No. 12/226,876, title "Method and System for Combining Text and Voice Messages in a Communications Dialogue", filed Apr. 26, 2007, claiming priority from FI 20060420, filed May 2, 2006; 10) Ser. No. 13/332,409, title "Financial Fraud Prevention Method and System", filed 21 Dec. 2011; 11) Ser. No. 13/452,229, title "Registration of recurring payment", filed Apr. 20, 2012; and 12) Ser. No. 13/452,311, title "One recurring payment invoking another", filed Apr. 20, 2012; 13) Ser. No. 13/514,980, title "Method and system for navigation-free online payment", filed Sep. 17, 2012, claiming priority from U.S. provisional application 61/285,532, filed Dec. 10, 2009; 14-15) Ser. Nos. 13/529,737 and 13/529,776, both titled "Managing recurring payments from mobile terminals" and filed Jun. 21, 2012; 16) U.S. provisional application 61/764,194, title "Techniques for directory services", filed Feb. 13, 2013, 17) U.S. provisional application 61/765,222, title "Pre-paid Top-up Service with Mobile Wallet", filed Feb. 15, 2013, 18) Ser. No. 13/800,641, title "Multi-factor authentication techniques", filed Mar. 13, 2013.

The entire contents of the above-identified parent applications is incorporated herein by reference. This means that features of the referenced parent applications can be employed in connection with the present disclosure, but to the extent that the parent applications define "the invention", it shall mean the invention disclosed in the respective reference documents.

FIELD OF THE INVENTION

The present invention relates to telecommunications. In particular, the invention relates to methods and systems for authentication and/or verification via telecommunications.

BACKGROUND OF THE INVENTION

Services that are booked or used via the Internet are constantly increasing. The Internet enables one to use several on-line services such as services connected to banks, health services, travel agencies, vehicle maintenance, and so on.

The increasing popularity of mobile computing and communications devices introduce new challenges to services on the Internet. Mobile terminals are able to deliver information to users when needed and where needed. Users want ubiquitous access to information and applications from the device at hand. They also want to access and update this information wherever they happen to be.

It is important to notice, however, that not all the terminals will be mobile. Future services must be able to communicate with a large variety of terminal devices, both those that are mobile and those that are not. Different terminal devices have very different capabilities.

Interoperability of different services and terminal devices requires standards on several levels. It is not enough to have, say, common communication protocols. It would be very important to share common concepts and understanding what a certain piece of data means in a certain context. However, it has been very difficult to agree on those issues, as there exists an enormous number of companies, organizations, and other actors in the field.

Many services must be able to manage bookings. They include for example booking appointments for health services; booking travel reservations for hotels, airlines, and rental cars; booking tickets for venues; booking appointments for vehicle maintenance; booking maintenance for apartments; and so on. It would be very useful, if those services could get information from one another. For example, if a customer is booking tickets for a concert, he or she might want to book a table in a restaurant also. It helps, if the restaurant's booking service gets basic information, like date and customer's name from the theater's booking system. Unfortunately, there have not been methods to exchange information between different kinds of booking systems.

Additionally, such services as well as other services/companies such as banks and credit card companies have long had the problem of verifying that the user attempting to make a reservation, booking or purchase is the actual user that they claim to be. Similarly, customers would like to know that the information that they are providing to these services/companies is going to the actual company and that their information is secure. With identity fraud resulting from submitting personal information over the internet being a concern for many web users there exists the need for a safer authentication alternative than currently exists.

Companies and organizations, such as software developers and pharmaceutical companies, have for a long time dealt with the problem of piracy. Not only are such entities harmed by lost sales from counterfeit goods but consumers who unknowingly purchase counterfeit goods can be harmed by, for example, malware installed by hacked software or poor quality and mislabeled counterfeit drugs. Currently, such companies are trying to develop methods in which the authenticity of their products can be easily determined by their customers either prior to purchase or prior to use.

For services such as booking or calendar functions, information exchange often takes place as synchronizing booking or calendar entries. For that purpose, several important standardization efforts are going on. For example, SyncML is an industry initiative to develop and promote a single, common data synchronization protocol.

vCalendar is an exchange format for personal scheduling information. It is applicable to a wide variety of calendaring and scheduling products and is useful in exchanging information across a broad range of transport methods. A number of vendors have adopted the specification because it allows their products to exchange calendaring and scheduling information. vCalendar is an open specification based on industry standards such as the x/Open and XAPIA Calendaring and Scheduling API (CSA), the ISO 8601 international date and time standard and the related MIME email standards. The vCalendar format utilizes data normally stored within a calendaring and scheduling application, facilitating the cross platform exchange of information about items such as events and to-do's. An event is a calendaring and scheduling entity that represents a designated amount of time on a calendar. A to-do is a calendaring and scheduling entity that represents an action item or assignment. For instance, it may be an item of work assigned to an individual.

vCard automates the exchange of personal information typically found on a traditional business card. vCard is used in applications such as Internet mail, voice mail, Web browsers, telephony applications, call centers, video conferencing, PIMs (Personal Information Managers), PDAs (Personal Data Assistants), pagers, fax, office equipment, and smart cards. In addition to text, vCard information may include elements like pictures, company logos, live Web addresses, and so on.

A common problem with all of these existing solutions is that they do not provide common semantics for different systems and the transfer of information may not always be as secure, or at least perceived as secure by customers, as many customers wish. Another problem is that booking systems have multiple different and usually quite complex user interfaces. If a customer wants to both make an appointment with a dentist and book a taxi to take him or her there, the customer needs to enter all the booking information to both booking systems in different ways. While the dentist may have in place a secure method of making reservations, authenticating the client who makes the reservation and receiving payment for a booking, the taxi company may not.

Additionally, it becomes challenging to manage client replies for instance when a client has been given a number of questions. For example, it makes sense to use SMS text messages to ask a client which option he or she chooses, because in many countries, like in Finland, it is very common to communicate with SMS text messages and they create revenues to operators. However, if a client replies to several inquiries by sending a number of text messages, it can be troublesome to find out, which answer corresponds to a certain question because the reply does not automatically include a reference to the question. Say, a service asks a client if they want to reserve, in addition to a flight ticket, also a taxi and a hotel room, and the client replies "yes" to one question but "no" to the other, the service does not necessarily know which offer the client has accepted.

Other problems, such as clients not showing up for appointments, not using a service more than once or long intervals between use of a service can be addressed through the use of new systems and methods.

Accordingly, attempts to execute financial transactions wherein clients utilize mobile terminals without additional proprietary software are handicapped by limitations of current mobile communication protocols, such as the short message service (SMS). Notably, the SMS protocol provides no standardized manner for authenticating mobile users or managing sessions. Lack of standardized authentication techniques leaves systems vulnerable to fraud, while lack of standardized session management makes it difficult for service providers to keep track of which of the clients' responses correspond to which questions from the service provider. On the other hand, session management, fraud prevention and introduction of new services should not be overly complex.

As regards introduction of services, a specific class of problems relates to trials of products or services. Unless explicitly stated otherwise, "service" shall be interpreted broadly to include delivery of products. In an exemplary case, a service provider offers trials of products or trial periods of services. Let us assume that the value of each instance of the service is low, comparable in value to the price of a meal, for instance. Let us further assume that the service is a can of soda from a vending machine. Prior art payment schemes involve various problems. Use of cash typically causes vandalism. It is risky for customers to use credit cards because the broader the credit card data is distributed, the bigger is the risk for the data to land in wrong hands. It is also inconvenient to set up an electronic wallet for products trials. A vicious circle emerges: customers may not bother to establish an electronic wallet because they aren't sure whether they like the product. As a result, the customers can't try the product until they have a wallet.

SUMMARY OF THE INVENTION

It is an object of the present invention to alleviate one or more of the problems identified above. Specifically, it is an object of the present invention to provide methods and equipment that provide improvements with regard to one or more of session management, fraud prevention and smooth introduction of services.

An aspect of the invention is a method comprising performing following acts on a network server:
  receiving a communication from a client terminal operated by a client;
  performing a first authentication of the client terminal and/or the client;
  in response to the first authentication being successful, delivering a first service to the client;
  after delivering the first service to the client, sending an offer for a second service to the client terminal;
  receiving an acceptance message for the second service from the client terminal;
  performing a second authentication of the client terminal and/or the client;
  in response to receiving the acceptance message for the second service from the client terminal and to the second authentication being successful, delivering a second service to the client;
  wherein the first authentication and the second authentication use different authentication techniques.

In some embodiments the first authentication and the second authentication may utilize automatic detection of one or more telecommunication addresses used in communication between the network server and the client terminal. For instance, the telecommunication addresses may be selected from a list that comprise a terminal identifier in a mobile cellular network, an e-mail address and a social network identity. In some use cases, the first or second authentication may comprise determining a telecommunication address, followed by determination of the identity of the client, wherein the client's identity is determined by a query to a database which associates terminal identities with client identities. In other cases it may suffice that the operator identifies and authenticates the terminal but not the client associated with it. In particular, if the client or user of the terminal pays for the services by using an online wallet, it may not be necessary to identify the person using the terminal.

In some embodiments the second authentication may comprise:
  randomly selecting one of a finite number of telecommunication addresses by which the network server is accessible;

using the randomly selected telecommunication address in an offer message from the network server to the client terminal;

authenticating the client terminal and/or the client if a reply message to the offer message is received from the client terminal at the randomly selected telecommunication address.

In some embodiments the second service may comprise setting up an online wallet for the client, and wherein the network server receives instructions to debit the online wallet for future services to the client.

In some embodiments the second service may comprise products delivered from one or more vending machines, and wherein the first service comprises a limited number of one or more products delivered from the one or more vending machines. In view of the fact that the first authentication is weaker than the second authentication, the operator's risk can be kept reasonable if the limited number is small, typically not more than 10 and preferably not more than 5, 3, 2 or 1.

In some embodiments the second service may comprise resources needed for transportation and/or accommodation, and wherein the first service comprises one or more advisory services related to the needed resources.

In some embodiments the second service may comprise content delivered from an online content repository.

Another aspect of the invention is a data processing system comprising:
    a memory system that stores program code instructions and data;
    a processing system including at least one processing unit, wherein the processing system executes at least a portion of the program code instructions and processes the data;
    a set of network interfaces for acting as a node and for communicating with other nodes in one or more telecommunication networks;
    wherein the memory system comprises program code instructions executable by the processing system, wherein execution of the program code instructions causes the processing system to perform the acts cited in connection with the method aspect of the invention.

Further aspects of the invention include a tangible computer program carrier embodying computer program instructions for instructing the various computers and servers to execute the above-identified acts.

BRIEF DESCRIPTION OF THE DRAWINGS

In the following section, specific embodiments of the invention will be described in greater detail in connection with illustrative but non-restrictive examples. A reference is made to the following drawings.

DETAILED DESCRIPTION OF SOME SPECIFIC EMBODIMENTS

Figure 14:
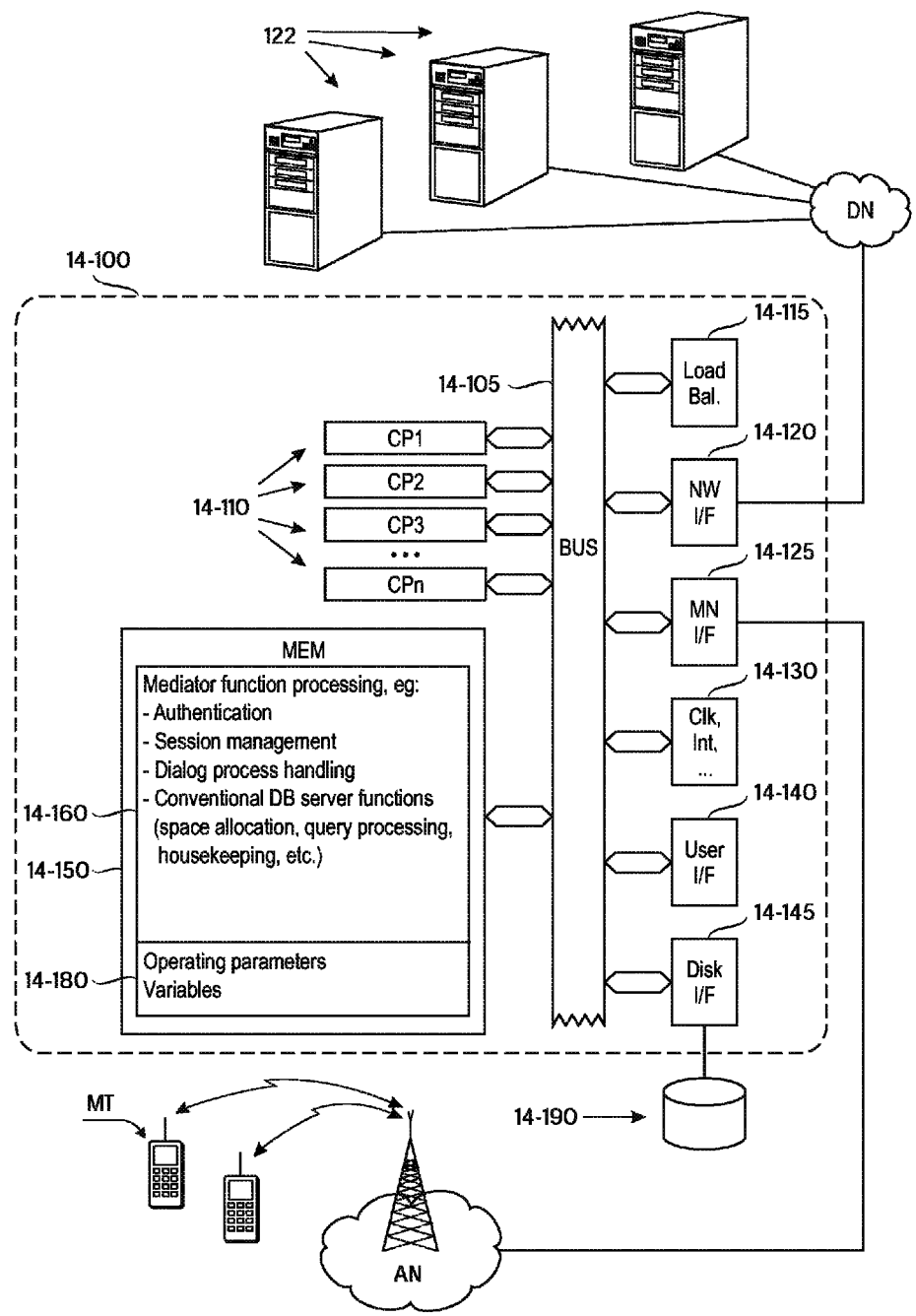
FIG. 14 schematically shows an exemplary block diagram for the various information processing and/or mediating servers in the systems described earlier.

This detailed section begins with a description of session management and authentication, with reference to FIGS. 1 through 8. It will be appreciated that the techniques for session management and authentication, as described in connection with FIGS. 1 through 8, are applicable to a wide range of services. For instance, FIGS. 9A through 9C and 10A through 10D relate to provisioning of services in a system wherein payments are processed by a payment processor that needs to comply with a strict set of certification requirements. FIG. 14 relates to an exemplary hardware description for the various servers and mediators.

The techniques disclosed herein can be used to provide a wide range of financial services and transactions, including but not limited to: booking of a primary service; booking of a related service that relates to the primary service; executing payment for the primary and/or related services. An illustrative but non-exhaustive list of services includes transportation, accommodation, nutrition, entertainment, services relating to health or appearances, consultation or other services. From the point of view of the technical problems to be solved, namely session management, authentication, fraud prevention and/or ease of service provisioning, no distinction needs to be made between services and physical objects. In other words, acquirement (eg purchase, loan, lease) of an object is an example of a service requested by a mobile user and offered by a service provider.

The service providers are those with whom clients want to make appointments, reservations, or other bookings and comprise the resources for the booking system to allocate. Service providers conduct business through service provider booking services. As used in this application, the mediator is a network based service available to the service provider booking services over the network that provides additional semantics, translation and synchronization services needed for communication of the information needed for a client to complete a transaction with a service provider. The service provider booking services and the mediator are preferably applications operating on network servers such as the Internet or a private intranet. In general, a system will comprise a plurality of service providers and service provider booking systems (implementing service provider booking services), but it is possible to have a simple booking system for only one service provider in which case the mediator and service provider could be tightly integrated into a single application.

Clients preferably include clients communicating on mobile telephones capable of receiving short text messages, such as Short Message Service (SMS) messages.

Of course, a system that is capable of handling SMS messages will also handle other clients with greater capabilities. In some implementations the mediator may communicate with mobile telephone clients through an SMS gateway. As is well known, SMS gateways are operated by mobile network operators. The mediator communicates with clients using dialogs. In some implementations, the dialogs are short messages which present information to the client and allow a simple reply. The dialogs preferably provide users with simple choices, such as a selection between "yes" and "no", or a simple selection from an ordered list. Dialogs can also be one way, such as an acknowledgment to a reservation. A transaction may typically involve a sequence of dialogs each involving a simple response. Dialogs involve asynchronous communication by messages. The system as described makes it possible to coordinate bookings among different service provider systems in order to fill a clients need, for example coordination of an airline booking with transportation to the airport.

Figure 1:
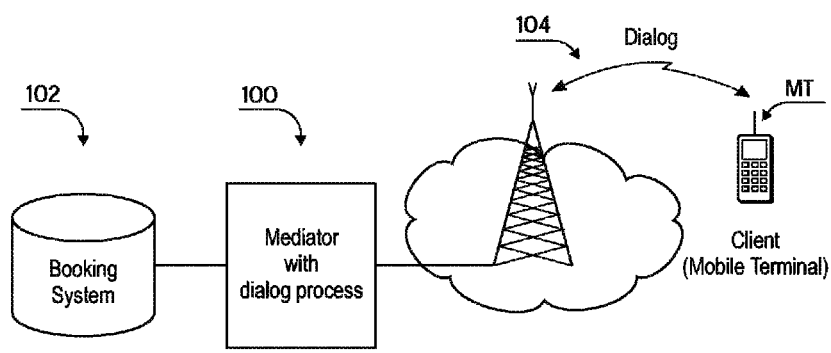
FIG. 1 shows a mediator that mediates services between a service provider and a representative mobile terminal, wherein the service being provided is a booking service.
Figure 2:
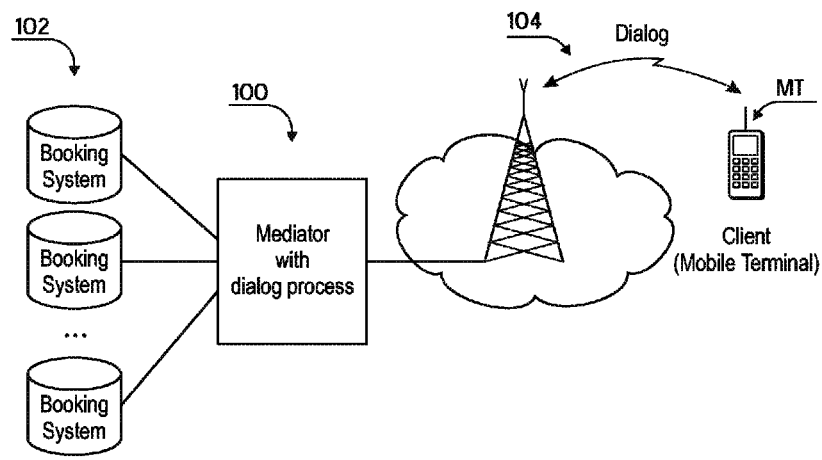
FIG. 2 shows a version of the mediator that is capable of serving multiple service providers.
Figure 3:
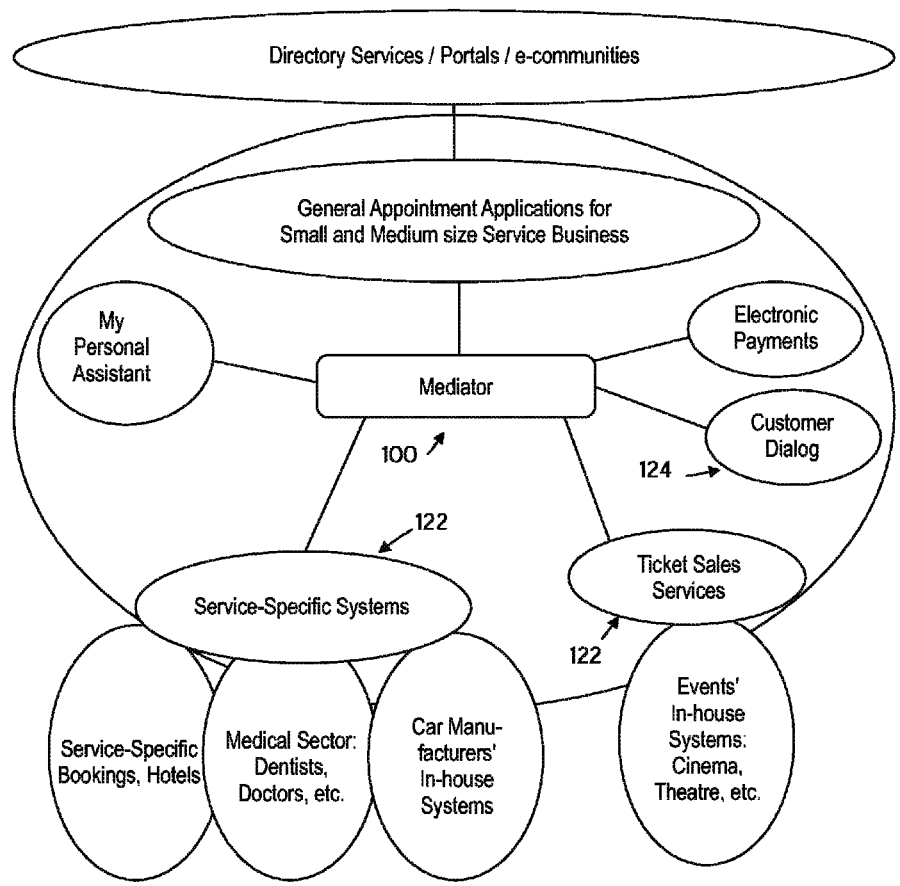
FIG. 3 represents a more detailed view of the system shown in FIG. 2.

FIG. 1 is a diagram of a simple system, wherein reference numeral 100 denotes a mediator, reference numeral 102 denotes a service provider's booking system, which is in communication connection with the mediator 100 over a data network, such as the internet. Reference numeral 104 denotes a user terminal having a dialog with the mediator 100 over a mobile network. FIG. 2 shows a plurality of service provider booking systems communicating with a mediator over a network. FIG. 3 shows a mediator 100 communicating with various service provider systems and users with telephone devices communicating dialogs.

A reason-based customer dialog is a desirable improvement from the client's point of view, because service providers can create their own dialogs for with each different kind of booking event. A dialog is closely related to a certain booking situation. A dialog may become activated automatically at the right moment, or the client can activate the dialog as needed, or another entity in the system can send a message to the dialog process of the mediator to activate the dialog. The dialog process then sends an inquiry to another entity in the system or informs the client and possibly inquires client's choices. By means of this kind of dialog, the client can make reservations in several booking systems using only one user interface. The dialog process connects to remote booking systems over an appropriate data network, such as the Internet or mobile networks.

A mediator service can be capable of transmitting booking information between service provider booking systems. For example, after a booking is entered into an airline booking system, a taxi booking system can offer the client a lift to the airport. In this application, a booking is an allocation of a single resource (either the airline booking or the taxi in the previous example), while a reservation is the union of the bookings for all of the resources for the same event (the airline booking plus the taxi booking in the previous example). The dialog between the client, the mediator and the booking systems as well as stored customer profiles ensure that the client gets the reason-based service he or she needs, not intrusive advertising.

A client can make reservations as well as confirm, change, and cancel them using many kinds of communication means, including but not limited to the Internet, e-mail, and mobile terminals. The client can also synchronize a calendar provided by the mediator or a service provider with a calendar in a terminal device using mediator's synchronization functions.

A service provider can remind clients to make reservations on a regular basis and thus increase customer loyalty. A mediator can help service providers to bring their booking systems together to provide more comprehensive services without extending their businesses unnecessarily. Because of internationalization, the mediator is able to support for example many languages, time zones, currencies, and data formats.

The system, including at least a mediator, a dialog process, a service provider, and a service provider booking system, can be on one of the following levels:

1. There is a predetermined set of dialogs in the system. Their content and the possible choices are set in advance. For example, if a client books a flight, a dialog always offers certain other bookings. Client's prior actions are not taken into consideration.
2. There is an unlimited number of dynamic or "intelligent" dialogs that are based on, for instance, a profile that a client has created himself or herself, usage history records, and client's location. Simple logic supports decisions. It is a low-level expert system.
3. The system is able to make decisions by itself and to support client's decision making. On this level, a dialog process may include a high-level expert system. It can act as an agent and negotiate with several service providers to get the best offer without client's direct involvement.

In one exemplary use case, a client books a service from a service provider. The booking may be carried out using a terminal that is connected to the mediator service. First, the client connects to the mediator service using a dialog. The client inputs a reservation inquiry to the dialog process that sends the inquiry to the mediator. The mediator inquires possible reservations from the service provider's information system using concepts and terminology that those services are able to interpret. The inquiry is based on client's preferences. The client discloses some preferences that are related to the specific booking when they enter the reservation inquiry to the dialog. In addition, the dialog process and the mediator service may have stored a client's general preferences and use them so that the client do not need to input all the preferences each time.

In some implementations, management of the inquiry and booking processes may be based on sophisticated state models. Each booking process involves several phases that are described by states that track its status through its life cycle. For example, when the mediator has inquired about a reservation from a service provider, the corresponding entry in each system has a state that the booking is pending but not confirmed. If the systems do not have common understanding what a certain state means, the mediator translates them. A preferred booking process including the phases and states is described in Example 1.

In addition to inquiring reservations from the service provider, the mediator is able to synchronize bookings in several service providers' systems. The synchronization is based on rules specified in the mediator service. For example, a rule can be that "if a client inquires booking for an airline ticket, inquire also bookings for taxis to the airport." Therefore, an inquiry from the client may be multiplied in the mediator service resulting a number of inquiries. The service providers answer to the mediator if they are able to provide requested service and they may add some additional information, like on seats or timing. The mediator combines gathered information and sends it to the dialog process that shows a simple list of options to the client. For example, the dialog process may show three options for a flight and ask if the client also wants to reserve a taxi that is actually already tentatively booked by the mediator. The client makes his or her decision by choosing the options from the simple list of alternatives. The dialog process sends information on the client's choice to the mediator that confirms the bookings in accordance with client's choices and cancels the unnecessary reservations.

Figure 4:
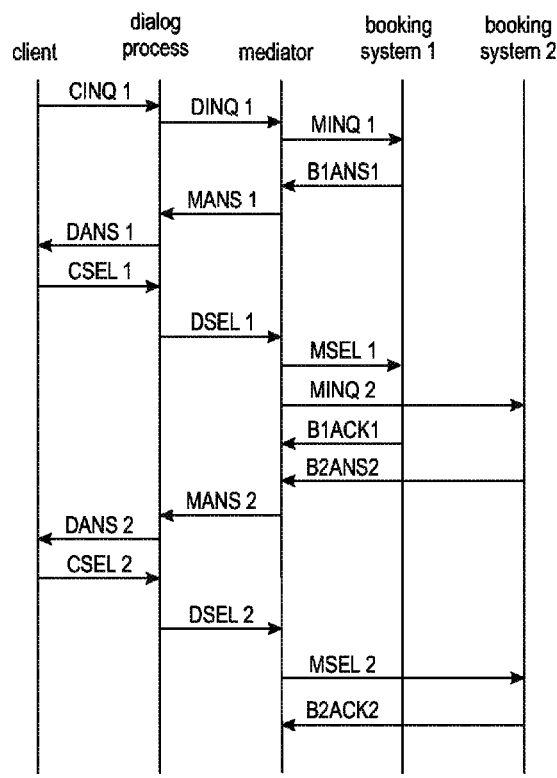
FIGS. 4 and 5 are signaling diagrams depicting typical use cases in a system as shown in FIGS. 1 through 3.

FIG. 4 shows a sequence diagram of an inquiry CINQ1 originated by a client using a dialog DINQ1 sent to the mediator. The mediator initiates the inquiry MINQ1 which corresponds to CINQ1 and DINQ1 to booking system 1 a service provider booking system. Ultimately an answer DANS1 gets back to the client offering a choice which is responded to with a selection CSEL1 resulting in a booking by the client on booking system 1. The mediator recognizes the potential need for a complementary service from booking service 2 and initiates an inquiry, MINQ2, to booking system 2, which ultimately results in a proposal including several choices, DANS2, returned to the client from which a selection, CSEL2, is made, resulting in a complementary booking on booking system 2.

The bookings can be done in other means as well, for instance, by calling the service provider with a telephone or by visiting on site the service provider's office. In that case the service provider may inform the mediator about client's bookings so that the mediator can inform the client on other options. For example, a dentist could tell the mediator that the client has booked an appointment so that the mediator may offer to book a taxi also.

Figure 5:
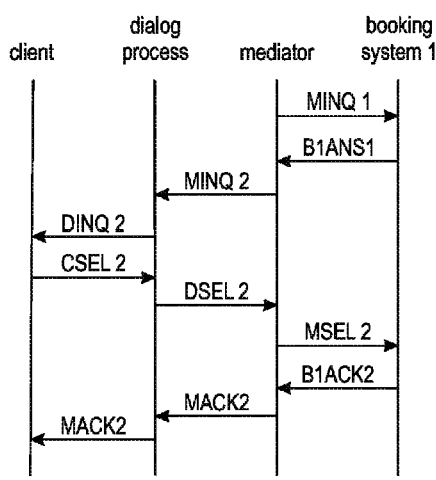

Also, it is possible to add a reminder to the mediator service so that the mediator asks at certain time if the client wants to make a new booking. For instance, the mediator can send a notice to the client that it has been a year since the client last had an appointment with his or her dentist and ask if the client wants to make a new appointment. This notice can already include a few options for the appointment. The mediator has checked the client's calendar if he or she has allowed that so that the given options are convenient for the client. The dialog shows the options in a simple and handy way. The client needs only to choose which option is the best for him or her or whether he or she wants to get new options or postpone the booking. FIG. 5 is a time sequence chart for a situation where the original inquiry, MINQ1, was initiated by the mediator.

Example 1

An Exemplary Booking System

Referring now to FIG. 3, an exemplary environment in which the invention can be utilized for management of bookings will be described below. In the implementation currently described, the mediator 100 is designed to interface with various service-specific systems generally denoted by reference numeral 122. These systems may be used to provide the services (including physical goods) described earlier. In a typical implementation, the mediator 100 interfaces to the service-specific systems 122 over a data network such as the Internet. The mediator 100 further interfaces to client terminals, such as mobile terminals capable of receiving text messages, over a mobile network. On a logical level, interfacing of the mediator 100 to the various service-specific systems 122 and other parties may be accomplished by means of generic XML definitions. For the exemplary case of managing of booking reservations, the mediator 100 may support vCard and vCalendar standards, since they are used by many major booking and calendar systems.

In the presently-described implementation, the mediator 100 communicates with the mobile terminals and their users using Short Message Service (SMS) via an SMS Gateway for asynchronous communication. The mediator 100 may comprise a customer dialog process 124 configured to use Dynamic Dialog Matrix (DDM) technique, which may be used to facilitate authentication and/or session management, as will be described in more detail in connection with FIGS. 4 through 8.

A clear distinction needs to be made between the booking processes of the ultimate service providers and those of the mediator. The booking processes of the ultimate service providers only cover normal booking with regard to time and resource reservation. The booking processes of the mediator comprise booking, work, and financing. Both processes lead to the same point. In a typical implementation, the process of the mediator comprises seven phases as follows:

Phases (Status Handling)

The phases set up a coupling (analogous with a bond or rubber band) between the resources. In each phase of the mediator process, data related to the booking will be amended to reflect the needs of the phase in question. For the statuses and values please see the underneath table. The phases are described in more detail in the following discussion.

1. Filing

Filing means initialization of a mediator process and a booking process. As a result of the initialization an entry is inserted in the database with basic information. It will not appear in a calendar since there is no scheduling information. It can be displayed in a separate task list of the owner as an open task.

2. Requesting

In the Requesting phase a booking request is sent to the resources required for the previously filed task. Since there is no scheduling, which in most cases will be essential, this phase may be executed together with the Scheduling phase.

3. Scheduling

Schedule is given to the owner and the resources. As a part and a result of the Scheduling the following data is needed:
a) suggested start-time (ISO time-stamp w/time zone)
b) suggested start-location (coordinates)
c) suggested end-time (ISO time-stamp w/time zone)
d) suggested end-location (coordinates)

4. Confirming

Time and location as it is accepted by the resources that have accepted. Data related to this phase:
a) accepted start-time (ISO time-stamp w/time zone)
b) accepted start-location (coordinates)
c) accepted end-time (ISO time-stamp w/time zone)
d) accepted end-location (coordinates)

By default the data is copied from the Requesting and/or Scheduling phases. In practice, if planned time is not needed, the same data structures can be used for this and status indicates the actual meaning of the data.

5. Working

The resources perform the booked task. Data related to this phase consists of different attributes and their values, which are related to the actual task. In addition, following static structures are needed:
a) actual start-time (ISO time-stamp w/time zone)
b) actual start-location (coordinates)
c) actual end-time (ISO time-stamp w/time zone)
d) actual end-location (coordinates)
e) products used, extras, mileage, . . . .

By default the data is copied from the Confirming phase.

6. Accounting

At this point all data stored in the data structures on previous phases is analyzed and processed for invoicing purposes. Data related to this phase: Accounting data. To be defined separately.

7. Completing

The task has been completed. As regards the mediator processes, it is irrelevant whether the task succeeds or not. Success or failure of the task is relevant to the Accounting phase, in which the financial actions to the organizer are handled. In this phase, housekeeping (database contents; temporary files, etc.) is performed in order to complete the mediator process. The following table shows data available in each phase. Booking phase is with "XX".

| Filing | X | | | | | XX | |
|---|---|---|---|---|---|---|---|
| Requesting | X | X | | | | XX | |
| Scheduling | X | X | X | | | XX | |
| Confirming | X | X | X | X | | XX | |
| Working | X | X | X | X | X | XX | |
| Accounting | X | X | X | X | X | X | |
| Completing | X | X | X | X | X | X | X |
| Phase/Data | Identifying | Resources | Suggested time | Accepted time | Task's work related | Accounting | Closing |

Phase Statuses, Values, and Transitions

The following table describes the phases, their statuses, and values along with transition to next logical phase based on the values gotten. In addition, corresponding vCalendar statuses are shown when applicable.

| Phase | Status | Next Phase | vEvent | vTodo |
|---|---|---|---|---|
| Filing | | Requesting | | |
| Requesting | | Scheduling | Sent | Sent |
| Scheduling | Pending | Confirming | Needs Action | Needs Action |
| Scheduling | Scheduled | Confirming | Needs Action | Needs Action |
| Scheduling | Re-scheduled | Confirming | Needs Action | Needs Action |
| Confirming | Accepted | Working | Confirmed | Accepted |
| Confirming | Declined | Accounting | Declined | Declined |
| Confirming | Tentative | Accounting | Tentative | |
| Confirming | Delegated | Requesting | Delegated | Delegated |
| Confirming | Re-scheduling requested | Accounting or Scheduling | | |
| Confirming | InProgress | Working | | |
| Working | InProgress | Working | | |
| Working | Delayed | Working | | |
| Working | Started | Working | | |
| Working | n % ready | Working | | |
| Working | Ready | Accounting | | |
| Accounting | | Completing | | |

| Phase | Status | Next Phase | vEvent | vTodo |
|---|---|---|---|---|
| Completing | <Copied from phase before Accounting> | n/a | | |

Internal phases Paused, Re-started, and Canceled act as follows for all relevant phases at any point:

| | | |
|---|---|---|
| <Phase y> | Paused | <Status x> |
| <Phase y> | Re-started | <Status x> |
| <Phase y> | Cancelled | Accounting |

Figure 7:
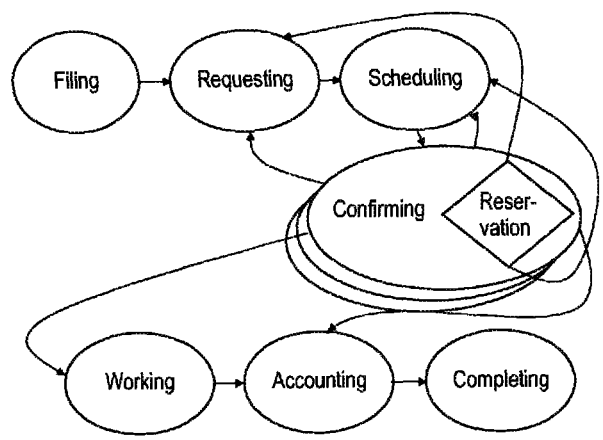
FIG. 7 shows detailed phases of the booking process which is an example of a service offered by a service provider.
Figure 8:
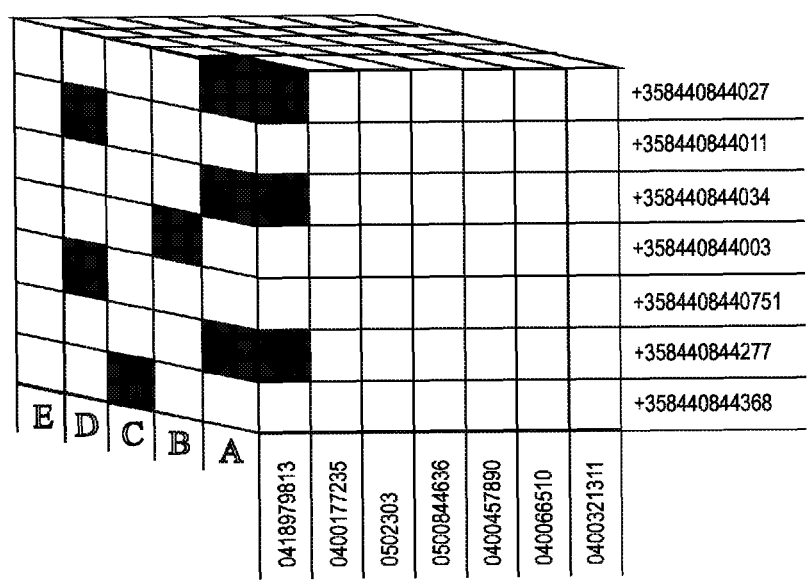
FIG. 8 shows an illustrative example of a dynamic dialog matrix.

FIG. 7 shows the work flow transitions from phase to phase. For conditions, see the table above. Also, please note that Canceled Status always leads to accounting.

Confirming the (Whole) Reservation

In order for the whole Reservation to be successful, all resources, which accepted the reservation, need to have the same scheduling. In addition, there will resources in different roles and data related to the working phase may vary greatly. The different statuses of the whole reservation are:

a) "NoReplies" (0) for "No-one hasn't replied to the request made by the organizer"

b) "NoDeclines" (1) for "Not all invitees have replied yet. The ones who have replied have accepted"

c) "AllAccepts" (2) for "all invitees have confirmed"

d) "SomeDeclines" (3) for "Some of the invitees have declined"

e) "AllDeclines" (4) for "All of the invitees have declined".

The following decision table helps in evaluating the status of the whole booking. "Maybe" means that this condition only does not incontestably specify true or false result.

| | Confirmations | | | | | | |
|---|---|---|---|---|---|---|---|
| Booking Status | No one answered | No one accepted | Some accepted | All accepted | No one declined | Some declined | All declined |
| NoReplies | True | Maybe | | | Maybe | | |
| NoDeclines | True | Maybe | Maybe | True | True | | |
| NoAccepts | True | True | | | Maybe | Maybe | True |
| AllAccepts | | | True | True | Maybe | | |
| SomeAccepts | | | True | Maybe | Maybe | Maybe | |
| AllDeclines | | Maybe | | | | | True |
| SomeDeclines | | Maybe | Maybe | | | True | Maybe |

Based on the information and decision table above the organizer/application has to make the decision of what to do with the reservation. That can be an automatic decision made by the system based on pre-set rules or made by the organizer manually.

Figure 6:
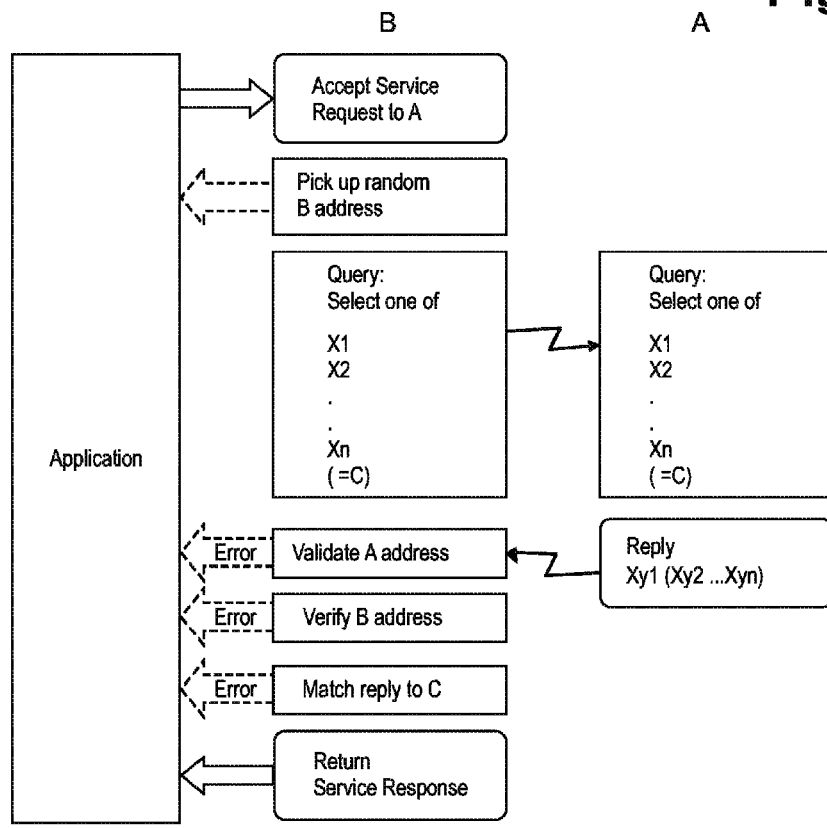
FIG. 6 shows an example of a dynamic dialog matrix being applied to a query and reply.

FIG. 6 shows an example of the dynamic dialog matrix applied to a query and reply. An application sends a service request to a user to a mediator B. The mediator B picks up random B address from a group of available B addresses wherein it can receive responses from the user. After defining the B address, the mediator B sends a query to user A, wherein the query may consist of a list of choices from which the user A may select the reply. The user A receives the query in their terminal and sends a reply to that query to the B address. The mediator B receives the user's reply in the B address. After receiving the reply from the user A, the mediator B processes the reply. First the mediator B validates the A address (which is the user's address). In case the A address does not correspond to the A address whereto the message was sent, the mediator B may inform the application that no response was received. In case the A address corresponds to the A address to which the mediator B has sent a query, the mediator B verifies the B address (the reply address into which the reply was received). Correspondingly, in case the B address is not a valid B address for the user, the mediator B may inform the application that no response was received. In case also the B address corresponds to the B address that the message was sent from, the mediator B matches the reply C to the list of available choices for that message. If the reply does not correspond to the available list of choices, the mediator B may send an error information to the application, or send a new query to the user A. If the reply corresponds to the available list of choices that was sent to the user, the mediator B sends a return service response to the application.

The system as described in connection with FIG. 6 may have a plurality of B subscriber addresses, such as telephone numbers, wherefrom the mediator B may select a subscriber number where the message to the user A is sent. Further, the user A preferably has a mobile telephone, having a mobile subscriber number, whereto the message is sent, and wherefrom the user A may respond to the query. The messages to and from the mediator B are sent over the telecommunication network.

A major problem solved by the dynamic dialog matrix is the challenge of managing client replies, when a client has been given a number of questions and the client is using SMS text messages or similar technology in which a reply does not automatically include an explicit reference to the inquiry. An inquiry always includes some kind of receiver's address or identification. In the SMS text message case that is so called B subscriber's number. On the other hand, sender's A subscriber's number or Calling Line Identity (CLI), or similar identification is also attached to each text message. Therefore the client or B subscriber is usually easily able to answer a message using mobile device's answer or reply function. If a mediator service that sends inquiries to a client, uses different A subscriber numbers in different inquires, it is possible to differentiate between answers based on which number the client is sending replies to. For example, if a mediator sends a client an inquiry "Do you also need a taxi?" using A subscriber number A1 and then inquiries "Do you need a hotel room?" from A subscriber number A2, client's reply to the first question goes to number A1 and the second answer goes to number A2. Using a dialog matrix, a mediator keeps track on inquires and answers. In the matrix, there is a column for each client and a row for each A subscriber number the mediator is using. Obviously, there could be a row for each client and correspondingly a column for each A subscriber number as well. After sending an inquiry from a certain A subscriber number to a client, the status and the reply is stored in the corresponding cell of the matrix. As a result, the mediator is able to find out whether the client has replied to a certain inquiry and what the answer was. Also, it is possible to use the matrix to collect information about clients' behavior and use it for example for marketing purposes. A mediator needs only a limited number of A subscriber numbers. A dialog matrix can also be used to find out which A subscriber numbers can be used when the next inquiry to a certain client is sent.

The use of the Dynamic Dialog Matrix as described above is illustrated in FIG. 7. The Dynamic Dialog Matrix is also a powerful but very simple security measure for authenticating a mobile phone user who has only the capability of sending and receiving messages. The problem is for a service to confirm a sender's identity. One way to try to identify the user is to check the sender's address. Normally SMS, e-mail, and other alike messages have the sender's address attached. That address can be for example the sender's A-subscriber's number or Calling Line Identity (CLI), or e-mail address or IP address. However, it is quite easy to falsify a sender address. From the service provider's perspective, the downlink from a service provider to a user is usually relatively reliable and it is hard for others to capture or change messages, but the uplink from a user to a service provider is much more vulnerable and it is not too difficult to give a wrong sender's address. A well-known solution to the above problem is to use encryption technologies to secure the communications, public-key infrastructures (PKI) being good examples. For instance, a user device can be equipped with a microchip, a secure SIM card in GSM devices for example, to encrypt messages using the user's private key. Then the service provider can be sure that the message is from the user, if it can be decrypted using the user's public key. However, this solution requires special devices that are not very common, inexpensive, or standardized so far. Relying on such a solution restricts the number of potential users significantly.

Using the DDM provides a novel solution. When the service sends a request to the mobile phone user, each request contains a different, preferably randomly chosen, reply number. Thus an acceptable answer is only the one that is sent to the correct reply address.

An example is for authenticating a user who is making a purchase, eg purchasing a software product "ABC". The user first initiates a purchase request to the company/service, eg directly in the software program, via an internet website or via a mobile device. The company/service then knows the user name and possible other identification information and sends a request to a credit card company to request a payment. The credit card company then sends a request to a mediator to authenticate the purchase. The mediator knows the user and the user's mobile number and sends a message, eg SMS or MMS, to the user's known phone number. An example of a message could be:

"Dear Mr. Client, your credit card was used to purchase product ABC on 27 Mar. 2010 for 299 euros. Please reply:

y—to accept the payment on VISA xxxx xxxx xxxx 123 n—to reject the payment or f—to report a fraud on your credit card".

By responding to the message from the known user's mobile number with an acceptable response allows the mediator to respond to the credit card company if the user authorizes the purchase or not. Thereafter, the credit card company may authorize the payment and inform the company/service. Additionally, if the mediator sends the message from a randomly chosen reply number as discussed above, there is an added layer of authentication. Because it is possible for a fraudulent user to determine a credit card holder's mobile number and fake a message from said number, it would be extremely improbable for them to know which reply number the authentication message would originate from. The above may also be used, for example, with money transfers between a user's bank and the company/service.

An additional element of safety and security can be achieved using semantic analysis. For example, if the user is asked to tell how many items are ordered, and the answer is "y" or "yes", then apparently the user did not know what the question was and the message was not an answer for the enquiry.

Such a system can also provide a level of security for the user. The mediator can authenticate the company/service, by any acceptable method, and only send authentication messages once the company/service has been authenticated. Then, if the user does not provide their mobile number when providing their identification information, when they get an authentication message, even from a number they do not recognize, they will know that the mediator has authenticated the company/service.

While the present example has been explained in terms of the mediator sending the message, the message could be sent by a secondary entity at the request of the mediator. For example, when the mediator receives a request to authenticate a transaction, the mediator can then provide the user's bank with the necessary transaction details and request that the bank send the necessary authentication method. Another example would be if the mediator sends a request to the bank for some of the user's identity information, eg mobile number, so that it can proceed with sending the actual request itself or through a tertiary service provider which handles the actual message sending.

Additionally, though the present example has been described with the transaction being the purchase of a product and authentication of the user for payment, the same system and similar method can be used for other transactions, such as the authentication of the purchased product.

The use of a Dynamic Dialog Matrix (DDM) allows for authentication and verification of products, services and transactions based on a plurality of combinations of data. Based on as little as two pieces of information from the DDM an entity can be verified. Based on more pieces of information from the DDM, a higher degree of verification can be achieved.

A DDM which is being used for verification purposes can contain, or have access to, multiple of some or all of the following: reply addresses used for sending messages, reply addresses for which messages are received, user addresses, questions, acceptable answers for questions, order of receiving answers and verification information (eg product keys, ID codes). A key to the DDM is that it allows verification between a company/service and a user through a mediator (and possibly through another party) by matching information that each entity knows and the others should not know. Some examples are as follows:

If a user downloads a piece of software from the internet they want to know that the software is legitimate, ie, not pirated or hacked, while software developers want to make sure that users are paying to activate their programs. Therefore, prior to use the user is requested to enter a product key. The user sends a message, eg SMS, to a number with a product ID code. If the ID code is valid and has not been previously registered then the user receives a message with the product key. Therefore, the DDM matches the user entered product ID code with an indicator if it has been registered to verify if a product key should be issued. A similar process could work in conjunction with the payment process described above. Once the purchase of the software is authenticated as described above then an additional message can be sent to the user with the applicable product key. A similar method and system can be used to verify the legitimacy of virtually any product, such as medicine or trademarked products. If the product has a code printed on the packaging and a known number associated with the products manufacturer or verification then a consumer can send a message to the known number with the product code to receive an indication if the code is valid and if it has been previously checked. Benefits to this system are that if pirated products do not have a code printed on the product or have an invalid code then the user will know right away. Additionally, if multiple users check the same code then the product manufacturer or verifier can check in to if the code has been reproduced by a manufacture of a pirated product. A further benefit to the system is that the product manufacturer can immediately send an inquiry back to the user if the product is determined to be pirated or suspected of piracy. An inquiry may be to ask where/when the product was purchased, what the purchase price was and/or other information which can be used to identify the entity responsible for the piracy or distribution of pirated goods.

The process may also be such that the user sends a code to the known number to receive information if the product is authentic or a pirate product. Thereafter, the manufacturer requests a further code or alike information from the user. When using two pieces of information (and possibly another sender identity than whereto the user sent the first message) to authenticate the product, the level of security is increased.

Figure 9A:
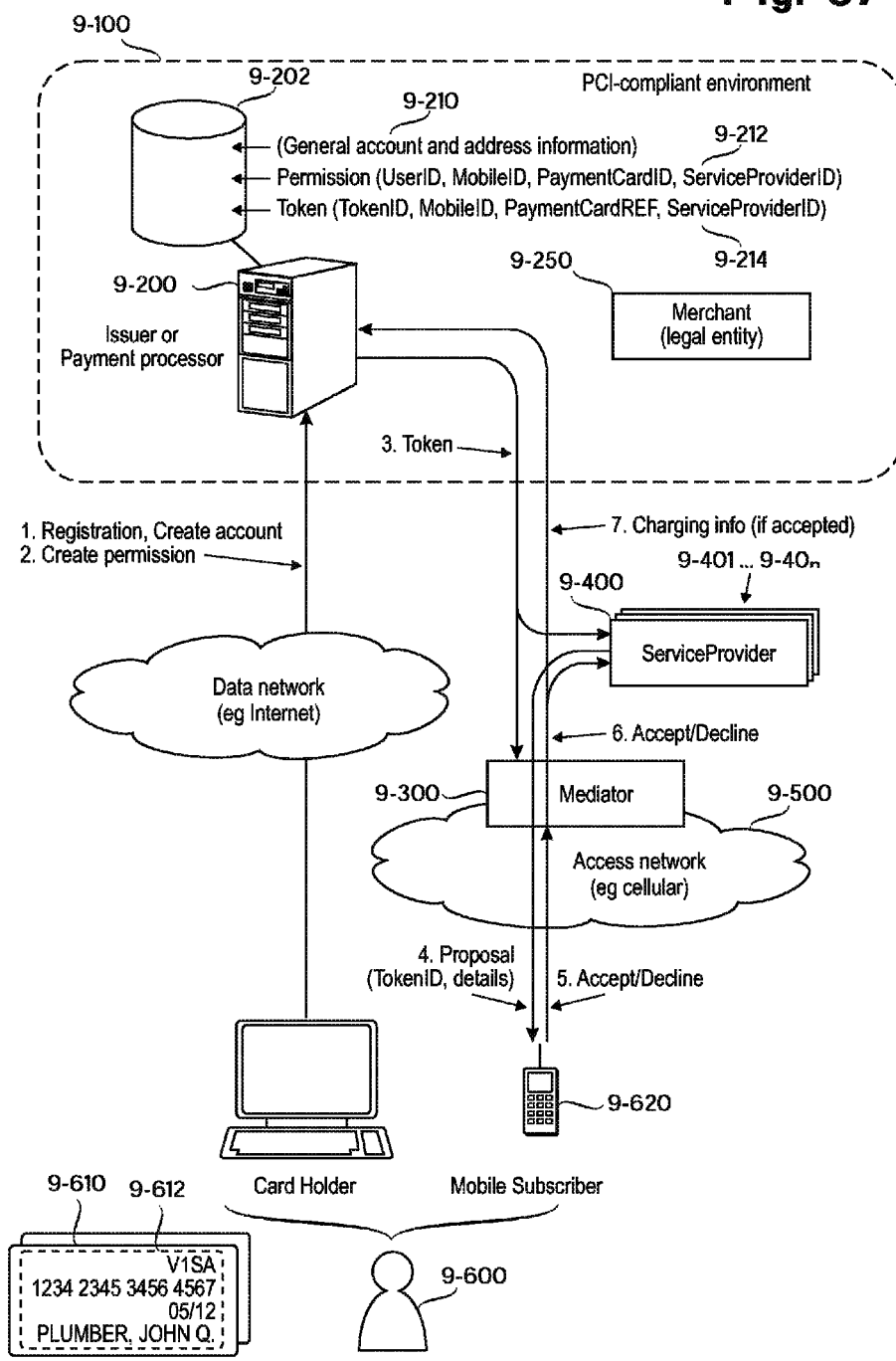
FIG. 9A is a block diagram of a system configured to authorize payments from mobile terminals.
Figure 9B:
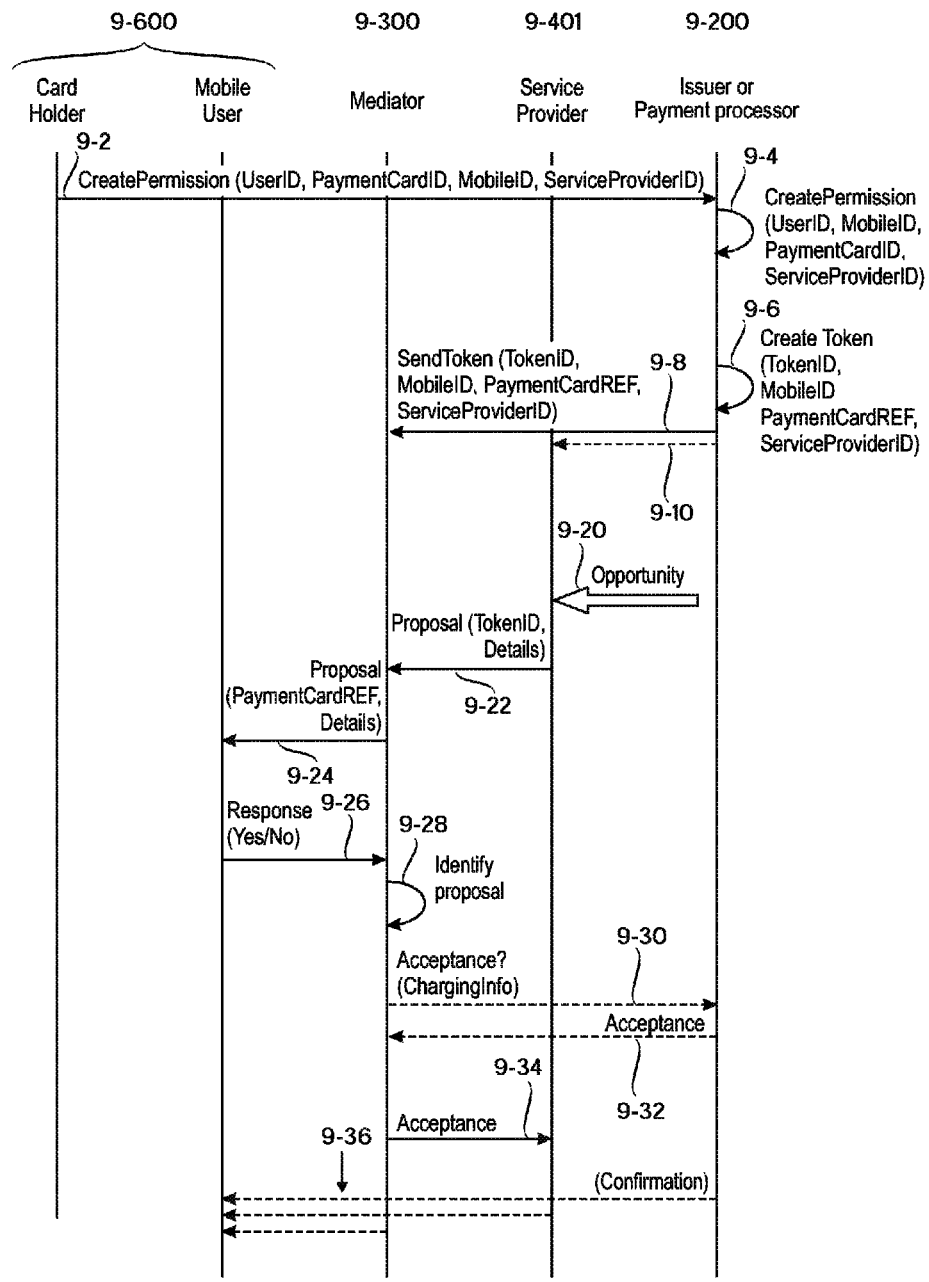
FIGS. 9B and 9C are signaling diagrams illustrating typical uses cases in the system shown in FIG. 9A.
Figure 9C:
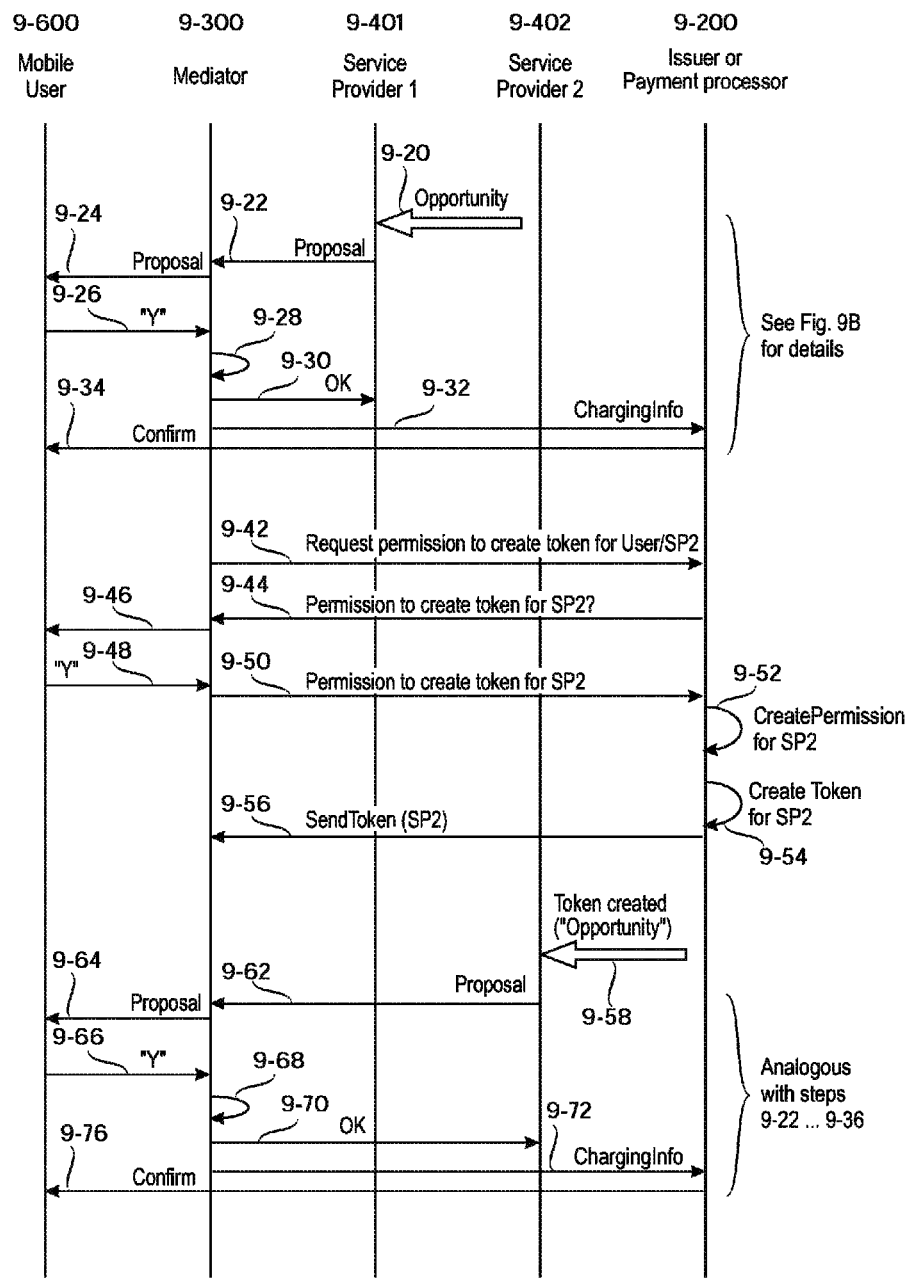

FIGS. 9A through 9C illustrate how an embodiment of the invention can be used to authorize recurring mobile payments. Specifically, FIG. 9A is a block diagram of an embodiment of the invention, which can be used to authorize mobile payments, while FIGS. 9B and 9C are signaling diagram illustrating series of events in the system shown in FIG. 9A.

As used herein, a mobile payment refers to a payment transaction effected over a mobile network.

Some of the elements shown in FIG. 9A are located in a PCI-compliant environment 9-100, wherein "PCI" stands for Payment Card Industry. Compliance specifications for the PCI-compliant environment 9-100 are published by PCI Security Standards Council, currently on address www.pcisecuritystandards.org.

The elements in the PCI-compliant environment 9-100 include a payment processor 9-200, its associated database 9-202 and at least one merchant 9-250 as a legal entity. The database 9-202 stores general account and address information 9-210 on the users and merchants. While storing such information is considered good housekeeping for auditing or the like, it is strictly speaking not essential for the present embodiment. Some of the merchants 9-250 operate respective online stores or service providers 9-400, 9-401 through 9-40n outside the PCI-compliant environment 9-100. When a representative service provider is discussed, reference numeral 9-400 is generally used, while reference numerals 9-401 through 9-40n may be used when individual service providers need to be referenced.

Other elements outside the PCI-compliant environment 9-100 include a mediator 9-300 and a number of users, a representative one of whom is denoted by reference number 9-600. The mediator 9-300 is a version of the mediators 100 described earlier, the present version being adapted to mediate between entities both inside and outside the PCI-compliant environment 9-100.

In the present embodiment, the user 9-600 has multiple roles. Firstly, the user is a customer of the processor 9-200 and accordingly, a holder of one or more payment cards, one of which is denoted by reference numeral 9-610. While reference numeral 9-610 denotes the payment card, reference numeral 9-612 denotes the information on the payment card 9-610 that suffices to globally identify the payment card. In other words, knowledge of the complete information 9-612 enables anyone having that knowledge to make payments (honest or fraudulent) that may be chargeable to the holder of the payment card 9-610. The user 9-600 is also a subscriber of a mobile access network 9-500 and a user of at least one mobile terminal 9-620.

When the system according to FIG. 9 is put into use, the following assumption and conditions are in force.

1. There is an initial trust relation between the payment processor 9-200 and mediator 9-300. For instance the trust relation may be established by legal contracts signed between the operators (as legal entities) of the processor 9-200 and mediator 9-300, and the legal entities instruct the processor 9-200 and mediator 9-300 (as network nodes) to trust each other. As used herein, an "initial trust relation" may mean, for instance, the processor 9-200 authorized the mediator 9-300 to process transactions within a set of initial limits. During operation of the system, the limits may be increased.
2. There is an initial trust relation between each service provider 9-401-9-40n and the payment processor 9-200. There is also an initial trust relation between each service provider 9-401-9-40n and the mediator 9-300.
3. There is an initial trust relation between the payment processor 9-200 and the user 9-600 as a holder of one or more payment cards 9-610.
4. There is an initial trust relation between the mediator 9-300 and the user 9-600 as a mobile subscriber using mobile terminal 9-620.

The set of initial trust relations have a few gaps, however. Firstly, because the processor 9-200 must operate in the PCI-compliant environment 9-100, it is imperative that the complete credit card information 9-612 (that is, information sufficient to make fraudulent purchases) is not conveyed outside of the PCI-compliant environment. This means, for instance, that although the mediator 9-300 is trusted to mediate payment card transactions between service providers and mobile users (as payment card holders), the mediator must be able to operate without information that globally identifies the users' payment cards. Furthermore, it is an open question what links each user's payment card(s) 9-610 and mobile terminal(s) 9-620.

It is another open question of how the various service providers 9-401 through 9-40n, or a subset of them providing mutually related services, can be authorized to offer services to a user 9-600 that has authorized mobile transactions from one service provider.

An elementary use case involving an initial transaction to an individual service provider will be described next, in connection with FIG. 9B. In step 9-2 the user 9-600 performs a registration to the web site of the processor 9-200. In the registration, the user 9-600 authorizes an exemplary service provider 9-401 to offer services that may be charged against the user's payment card 9-610. For instance, the registration may be performed over the internet by utilizing any internet-enabled terminal, which may or may not be the same terminal as the user's mobile terminal 9-620. In the registration, the user may be authenticated by utilizing bank authentication, for example. In some implementations, the initial registration 9-2 may require bank authentication or some other form of strong authentication, while subsequent uses, such as configuration changes, may require lesser authentication, such as a user ID/password combination that is issued during the initial registration 9-2.

The user effectively gives a permission for service provider 9-401 to offer services to the user 9-600, by referencing the payment card 9-610. In step 9-4, the processor 9-200 stores information on the permission given by the user 9-600. For instance, the processor 9-200 may store an information tuple 9-212 that comprises the user's true identity, mobile identity, payment card number and the service provider's identity. Again, the information tuple 9-212 is considered good housekeeping for auditing purposes while, strictly speaking, it is not absolutely necessary to effect payments.

In step 9-6 the processor 9-200 creates a "token" 9-214 that indicates to the mediator 9-300 that the information tuple 9-212 has been established. For the purposes of the present embodiment, the token 9-214 is a filtered or reduced version of the information tuple 9-212 that fully identifies the permission given by the user 9-600 to the service provider. For instance, the full identification information 9-612 on the user's payment card(s) may not be conveyed to entities outside the PCI-compliant environment. Instead of the full identification information 9-612, the token 9-614 only contains sufficient information to identify a specific payment card 9-610 to the user/card holder 9-600. In the present context, such information is shown as "PaymentCardREF" in the drawings, as this information item enables the mediator to reference the specific payment card 9-610 to the user/card holder 9-600. In the example shown, the "PaymentCardREF" information item may have a value of "V1SA_4567", whereby it identifies the specific payment card among the present user's payment cards but fails to globally identify the payment card. In step 9-8, the issuer/payment processor 9-200 sends the token 9-214 to the mediator 9-300. In an optional step 9-10, the issuer/payment processor sends the token to the service provider 9-401.

In step 9-20, the service provider 9-401 detects an opportunity to send a service offer to the mobile terminal 9-620 of the user 9-600. There are many ways for the service provider 9-401 detect such an opportunity. For instance, service provider 9-401 may detect that the user is about to request or has requested some service(s) from the service provider, and the service provider may offer some related service(s) to the user. Alternatively or additionally, the user 9-600 may navigate to the service provider's web site and request information on services, thereby permitting sending of service offers to the user's mobile terminal. In step 9-22 the service provider 9-401 sends a service proposal to the mediator 9-300. The service proposal 9-22 contains an identifier of the token 9-214 that was created in step 9-6. The service proposal 9-22 further contains details of the offer, such as what is being offered and at what price, etc. In step 9-24 the mediator 9-300 reformats the offer and relays it to the user's mobile terminal 9-620. In addition to the details of the offer, the reformatted offer 9-24 contains the "PaymentCardREF" information item, which only identifies the payment card to the user/card holder 9-600 but fails to globally identify it. While the reformatted offer 9-24 is sent to the user's mobile terminal 9-620, the service provider 9-401 does not have to send the mobile ID to the mediator 9-300 because the mobile ID can be obtained from the token 9-214 that was sent to the mediator in step 9-8.

In step 9-26 the user 9-600 responds from their mobile terminal 9-620. Assuming that the DDM technique described elsewhere in this patent specification is used, the user 9-600 user only has to send a "Y" for "Yes" and anything else (including no response) for "No", for example. Similarly, the offer may contain a list of choices (e.g. A, B, C, D) from which the user selects one by replying a "A" for choice A. Even if multiple service providers 9-401-9-40n are sending multiple offers each, the DDM technique keeps track of which response from the user corresponds to which service offer from which service provider. In step 9-28, the mediator 9-300 utilizes the DDM technique and thereby identifies which service offer the user is responding to. In optional steps 9-30 and 9-32 the mediator 9-300 may request acceptance from the issuer/service provider 9-200, which may perform a credit check, for example. If the outcome of the credit check is positive, the issuer/service provider 9-200 provides an acceptance to the mediator's request. The exchange of messages 9-30 and 9-32 serves two purposes. Firstly, the mediator conveys information on the user's acceptance to the issuer/payment processor 9-200 for charging purposes, and secondly, the mediator requests the issuer/payment processor 9-200 to carry any credit or security checks compliant with the policies of the issuer/payment processor. In step 9-34, provided that the outcome of the check(s) is positive, the mediator 9-300 forwards the user's acceptance to the service provider 9-401.

In step 9-36, the mediator, the issuer/service provider and/or the service provider may send a confirmation to the mobile user/card holder 9-600. Strictly speaking, the confirmation is considered good manners and good housekeeping, but is not absolutely essential for providing the requested service. In some implementations the step 9-30 through may be executed in different orders and/or by different entities. As is apparent from the drawing, after step 9-34, each of the mediator, issuer/service provider and/or service provider know equally well that everything is in order, and any entity can send the confirmation to the mobile user.

While the above steps 9-2 through 9-34 suffice to establish recurring payments in respect of one mobile user/terminal and one service provider, there is a desire to facilitate combining service offerings from multiple related service providers.

For instance, assume that the service provider 9-401 is an airline carrier. Under this assumption, the opportunity-detecting step 9-20 may be implemented such that airline carrier is an example of a merchant 9-250 inside the PCI-compliant environment 9-100, and this entity notifies the service provider 9-401, which is an example of an online store outside the PCI-compliant environment 9-100.

In some use cases the airline carrier's online store may use the opportunity 9-20 to offer additional services, in which case the payments may be processed as described in connection with FIG. 9B (initial preparatory steps 9-2 to 9-8, recurring steps 9-22 to 9-34). In an illustrative but non-exhaustive example, the first service may be an airline ticket, while the additional services may include one or more of a seat upgrade, user-selectable seat, shuttle service, or any additional service provided by the service provider 9-401 by using the token created in steps 9-6 . . . 9-8.

In other use cases it may be desirable to offer services to a user 9-600 from related service providers, wherein the mediator 9-300 has no token for the combination of user and service provider. In such cases, a number of issues should be resolved. For instance, which service providers, related to the original service provider 9-401, should be permitted to offer related services? As used herein, the original service provider means the service provider wherein the mediator has a token for that service provider and the user. While useful information on related services is often valuable to a customer, unreasonable spamming is not. Another open question is which entity should discriminate between service providers who may offer related services to the user and service providers who may not. Yet another open question which information is to be used and how in the discrimination between the service providers.

In some implementations, the mediator 9-300 determines which related service providers may send offers to the user 9-600, in a situation wherein a token exists for the user 9-600 and an original service provider 9-401. In the present context, the original service provider means the one from whom the user has requested one or more services.

There are many different techniques by which the mediator 9-300 may determine which related service providers may send related offers to the user 9-600. For instance, the operators of the various service providers (as merchants/legal entities 9-250) may agree on a set of initial trust level and a set of initial rules, and these sets of rules are delivered to the mediator. In a more ambitious implementation, the mediator 9-300 may dynamically adjust the trust level and/or the rules. For instance, the mediator 9-300 may adjust the trust level and/or rules based on implicit and/or explicit feedback from the users. In an illustrative example of implicit feedback, the mediator 9-300 monitors the acceptance rates of service offers from the service providers and increases or decreases the trust level depending on whether the acceptance rate meets or fails to meet some static or dynamic threshold value. A limitation of this technique is that the trust level of service providers is based on acceptance of the offer but the actual quality of the service is not evaluated. In an illustrative example of explicit feedback, the mediator 9-300 monitors feedback from the users, which is separate from the acceptance of service offers. Such separate feedback, which may be entered from the users' mobile terminals or web terminals, may take into account the actual quality of the service.

Assuming that service provider 2, denoted by reference numeral 9-402, is one that meets the mediator-implemented criteria such that the service provider 2 is permitted to send offers to the user 9-600 that has already accepted offers from service provider 1 (and creation of a token for that service provider 1).

Referring now to FIG. 9C, steps 9-20 through 9-34 have already been described in connection with FIG. 9B, and a duplicate description is omitted. The steps 9-20 through 9-34 are repeated in FIG. 9C for the user's convenience, with abbreviated legends.

The second major section in FIG. 9C, namely steps 9-42 through 9-56, relate to creation of a token for recurring payments from the user 9-600 to service provider 2, 9-402. What these steps accomplish, is largely analogous with creation of the token for recurring payments from the user 9-600 to service provider 1, 9-402, that was described in connection with FIG. 9B (see steps 9-2 through 9-8 for details). The actual implementation is different, however. In the token-creation phase of FIG. 9C, steps 9-42 . . . 9-56, it is not the user 9-600 who has the initiative but the mediator 9-300. Accordingly, the user need not explicitly register mobile payments for each individual service provider. On the other hand, creation of the token for the user and service provider 2 is not completely beyond the control of the user either. In a preferred implementation, the user's permission to create a token for related service providers is requested but inconvenience to the user should be restricted to the minimum. Steps 9-42 through 9-56 illustrate one way of accomplishing that.

As a result of step 9-26, the mediator 9-300 knows that the user 9-600 has authorized mobile payments for services from service provider 1, 9-401. The mediator 9-300 now uses this piece of information and, in step 9-42, prompts the processor 9-200 to request permission to create a token for the combination of user 9-600 and service provider 2, 9-402. In step 9-44 the processor 9-200 requests permission from the user 9-600 to create the token. In step 9-46 the mediator 9-300 relays the request to the mobile terminal 9-620 of the user 9-600. In the present example, the user accepts the creation of the token and sends an affirmative response (eg "Y") in step 9-48. In step 9-50 the user's permission to create the token is conveyed to the processor 9-200, which creates a record indicating the user's permission in step 9-52. In step 9-54 the payment processor creates the actual token, which is sent to the mediator in step 9-56. The three last steps of this phase, namely steps 9-52 through 9-56 are similar to the respective steps 9-4 through 9-6 in which the first token was created in FIG. 9B.

The difference to steps 9-4 through 9-6 of FIG. 9B is that in FIG. 9B the user 9-600 does not have to initiate the token-creation process, authenticate him/herself, provide any details. Instead it is the mediator that initiates the token-creation process, based on the knowledge that the user has requested service (and accepted charging) from service provider 1, for which the mediator is aware of related service providers. The mediator does not have all the required information for the token-creation process, nor does it need to have. Instead, the mediator only needs to know that the a token for the combination of the user 9-600 and service provider 2, 9-402 should be created, or that permission for its creation should be requested from the user. The remaining details for the user's permission and token, most notably the payment card identification information 9-612, are known by the processor 9-200.

It is also worth noting here that the user needs to authenticate him/herself and/or specify which offers from multiple simultaneous service offers from one or more service providers are accepted and which are declined. It is possible to utilize the DDM technique described earlier in this patent specification to provide authentication and/or matching user responses to service offerings. In some implementations the DDM technique may be omitted, at least for lows valued transactions and/or in connection with users with good history.

As a result of the token-creation process that was notified to the mediator in step 9-56, service provider 2, 9-402 is now notified of the creation of the token. This notification step 9-58 deliberately leaves open the question of which entity sends the notification. Depending on implementation, the notification can be sent from the processor 9-200 or mediator 9-300 as they both have the same information available.

Steps 9-62 through 9-76, in which the service provider 2, 9-402 sends an offer to the user 9-600 and the user accepts, are analogous with the respective steps 9-22 through 9-34, the sole difference being the service provider. In the first case (steps 9-22 through 9-34) it was service provider 1, while in the latter case (steps 9-62 through 9-76) it was service provider 2.

FIGS. 10A to 10D illustrate further variations for the embodiments described in connection with FIGS. 9A-9C. In FIGS. 10A to 10D, elements with reference numbers beginning with "10-" are described here for the first time. The remaining elements have been described in connections with earlier drawings, and a duplicate description is omitted. Elements with reference numbers 9-xxx and 10-xxx, wherein "xxx" is the same across the drawings, generally relate to similar or corresponding elements, and only the differences to the corresponding element 9-xxx are described.

Figure 10A:
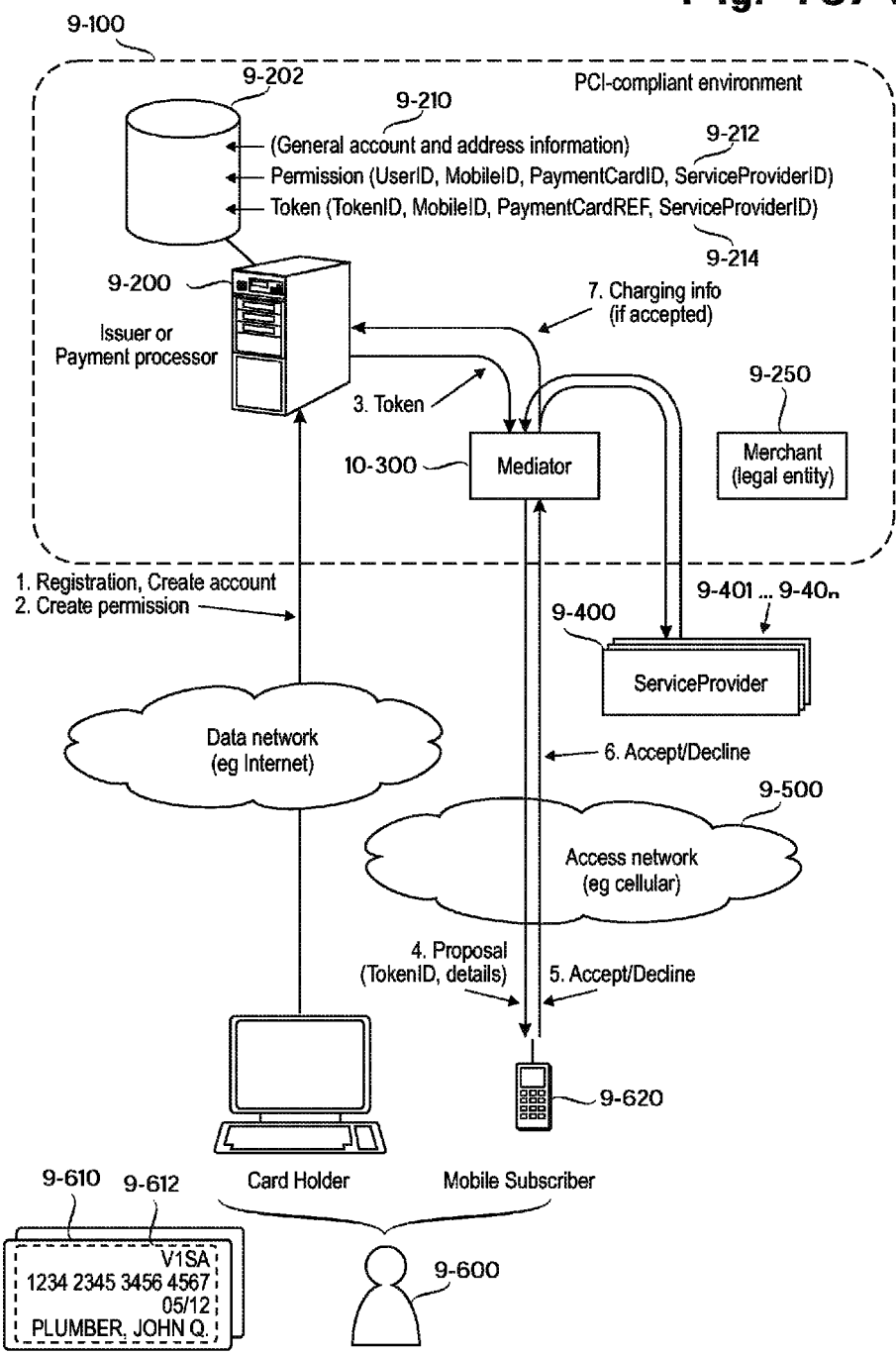
FIGS. 10A to 10D illustrates further variations for the embodiments described in connection with FIGS. 9A-9C.

Specifically, FIG. 10A shows an implementation in which the mediator, now denoted by reference numeral 10-300, resides inside the PCI-compliant environment 9-100 ("PCI"=Payment Card Industry, see description of FIG. 9A). This implementation makes it easier for the other parties, such as the operators of the issuer or payment processor 9-200 and/or merchants 9-250 or service providers 9-400, to trust the mediator.

The mediator 10-300 generally corresponds to the mediator 9-300 described in connection with FIGS. 9A-9C. The difference to the prior implementation is that the mediator 10-300 resides inside the PCI-compliant environment 9-100 and naturally complies with all of the PCI infrastructure specifications and certifications. The signaling diagrams shown in FIGS. 9B and 9C are directly applicable to the implementation shown in FIG. 10A.

The fact that the mediator 10-300 resides inside the PCI-compliant environment and complies with the PCI specifications and certifications may have a variety of different implementations, including some or all of the following:

The mediator may be implemented and operated by a legal entity whose employees undergo security clearance.

The mediator, or at least critical portions of it, are programmed or monitored by one or more well-trusted parties, and the integrity of the mediator is verified with cryptographic techniques. For instance, certificates verified by a trusted entity may be used. Alternatively or additionally, some critical portions of the mediator may be firmware coded in a manner similarly to mobile SIM cards, which are authenticated by using a challenge-response mechanism. In the case of a SIM card provided by a mobile operator, the authentication algorithm that runs on the SIM is typically given a 128-bit random number (RAND) as a challenge. The SIM runs an operator-specific confidential algorithm which takes the RAND and a secret key Ki stored on the SIM as input, and produces a 32-bit response (SRES) and a 64-bit long key Kc as output. The same authentication scheme can be used in such a manner that the issuer/payment processor (as a legal entity) acts as the mobile operator acts in the SIM card example. In other words, the entire software of the mediator, or a critical subset of it, may be coded, or at least inspected, by experts trusted by the issuer/payment processor. The software, which includes the critical parts of the mediator functionality and the challenge-response mechanism, may be coded into firmware from which the mediator (as proxy server) may execute it.

Figure 10B:
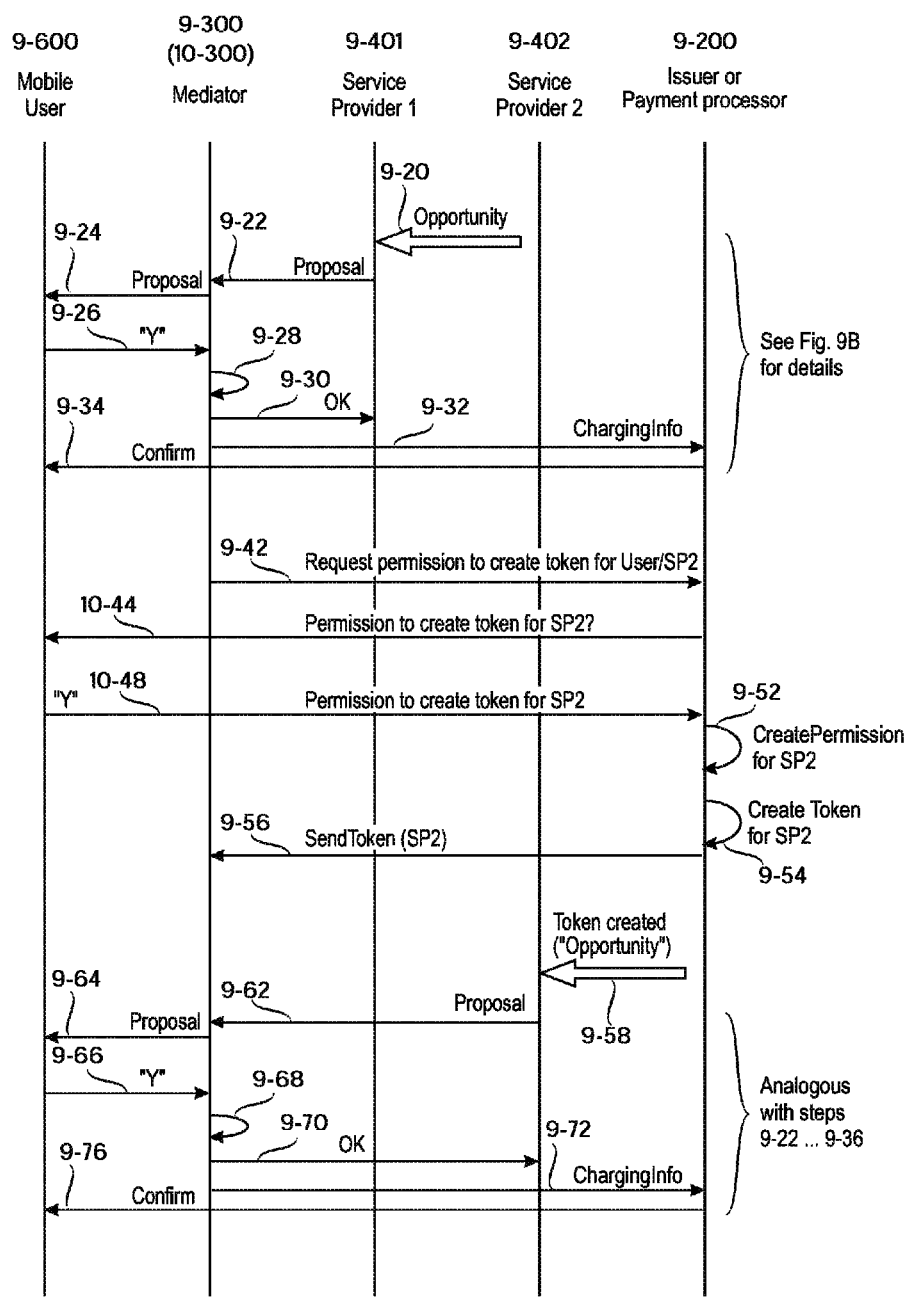

FIG. 10B is a signaling diagram, which shows a variation from the signaling diagram shown in FIG. 9C. Compared with the previous signaling diagram, some of the tasks of the mediator are now delegated to the issuer or payment processor 9-200. In the earlier signaling diagram of FIG. 9C, the mediator performs two kinds of tasks. In step 9-42 the mediator initiates a procedure which results in creation of a token for the combination of a user N and server provider 2, provided that a token already exists for the same user N and a related service provider 1. In step 9-64 the mediator mediates a service offering from service provider 2 to the user N and relays the acceptance from user N to service provider 2 and to the issuer or payment processor. Now, suppose for an instant that the operator of the issuer of payment processor 9-200 does not trust the operator or mediator 9-300, 10-300. If the operator of the mediator was fraudulent, the mediator would have to perform these two tasks (the one beginning in step 9-42 and the one beginning in step 9-64) fraudulently. In other words, the fraudulent mediator has to send both messages 9-50 ("permission to create token for service provider 2") and 9-70 ("proposal OK") to the issuer or payment processor 9-200, without the consent of the user 9-600.

In the signaling diagram of FIG. 10B, the issuer/payment processor 9-200 directly obtains the permission to create the token for user N 9-600 and service provider 2, thus bypassing the mediator in the token-creation step. The issuer/payment processor 9-200 proposes token creation to the user in step 10-44 and obtains the user's permission in step 10-48. Step 10-44 corresponds to steps 9-44 and 9-46 of FIG. 9C, while step 10-48 corresponds to steps 9-48 and 9-50, apart from the fact that the mediator is bypassed, at least for this particular case.

Because the issuer/payment processor 9-200 is a party, which is trusted by each of the other entities, the fact that the authorization to create the token was obtained by the issuer/payment processor makes it easier for issuer/payment processor and the other entities to trust the mediator.

In a variation of the signaling diagram of FIG. 10B, the mediator may mediate the token-creation step similarly to the case shown in FIG. 9C (steps 9-48 through 9-56), but in this variation the issuer/payment processor 9-200 directly obtains the user's authorization to some or all of the individual transactions. What this means is that the mediator is bypassed in steps 9-64 through 9-72 for some or all transactions. For instance, the issuer/payment processor may decide to bypass the mediator for some or all of the following cases:
 a random selection from all transactions;
 all transactions whose value exceed a given threshold;
 a random selection from transactions over a given threshold value;
 a number of first transactions for the mediator, user and/or service provider;
 a number of first transactions for a combination of user and service provider In a very ambitious scheme, some or all of the parties other than the issuer/payment processor, namely the mediator, user and service provider, have a low initial trust value. For any party, the initially low trust value is increased for any successfully completed transaction. A high-valued transaction increases the trust value of the parties of the transaction more than a low-valued transaction does. The trust value may be lowered by time, delayed payments or other forms of suspected behavior. If any party of a transaction has a low trust value, or a combination of the trust values of the parties of the transaction is low, either on an absolute scale or in comparison with the value of the current transaction, the issuer/payment processor may decide to bypass the mediator and obtain the user's authorization directly.

Figure 10C:
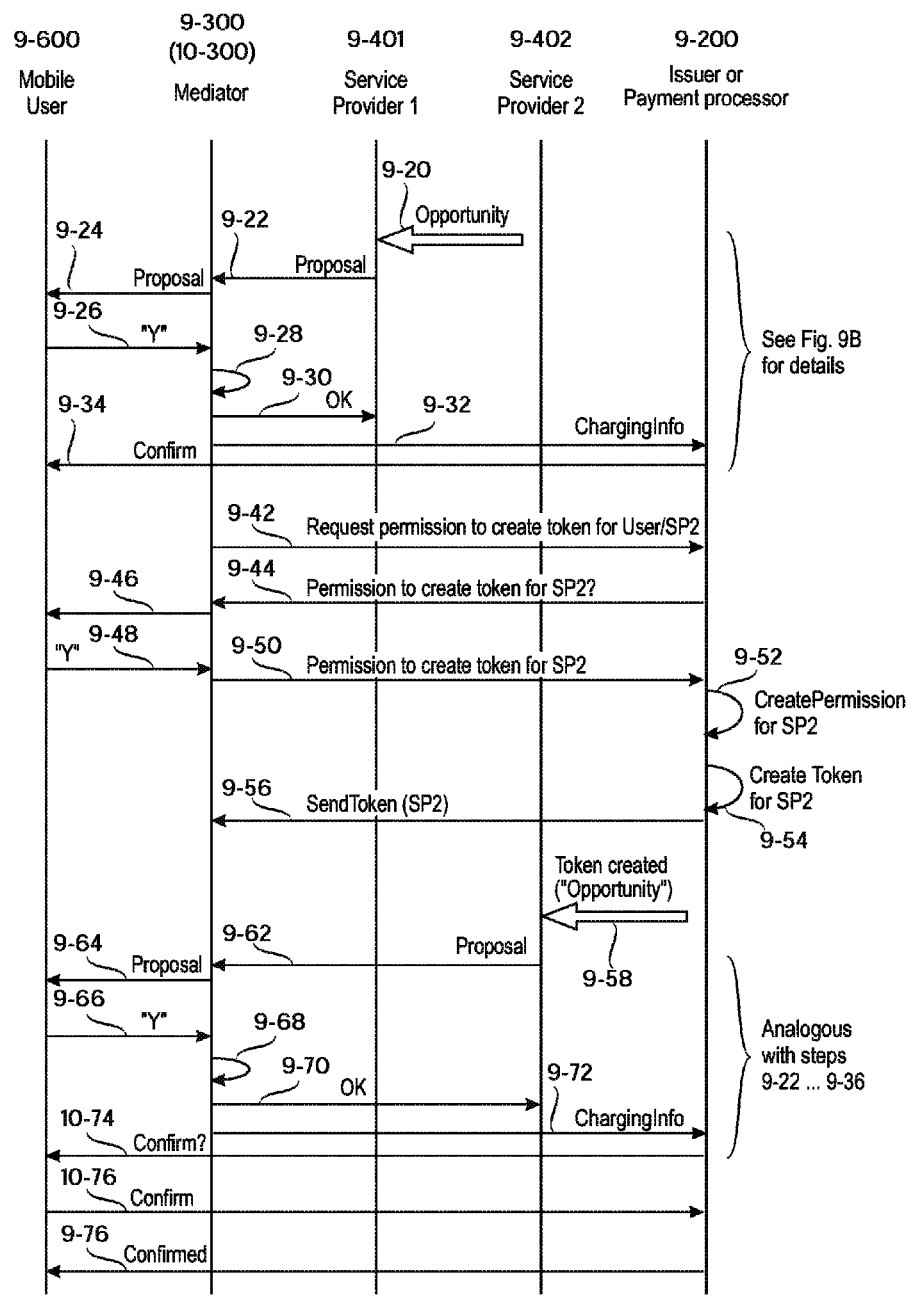

The signaling diagram of FIG. 10C shows a different variation from the one shown in FIG. 9C. In the signaling diagram of FIG. 10C, steps 9-42 through 9-56 are similar to those shown in FIGS. 9B and 9C. This means that the mediator 9-300 is in charge of obtaining the permission for the token creation from the mobile user 9-600. FIG. 10C differs from FIG. 9C in that the final confirmation 9-76 from the issuer/payment processor 9-200 to the mobile user 9-600 is preceded by a confirmation check 10-74, 10-76 between the issuer/payment processor 9-200 to the mobile user 9-600. In other words, the issuer/payment processor 9-200 may, at least for some of the individual transactions, bypass the mediator 9-300 and directly obtain the user's authorization to some perform or all of the individual transactions.

Figure 10D:
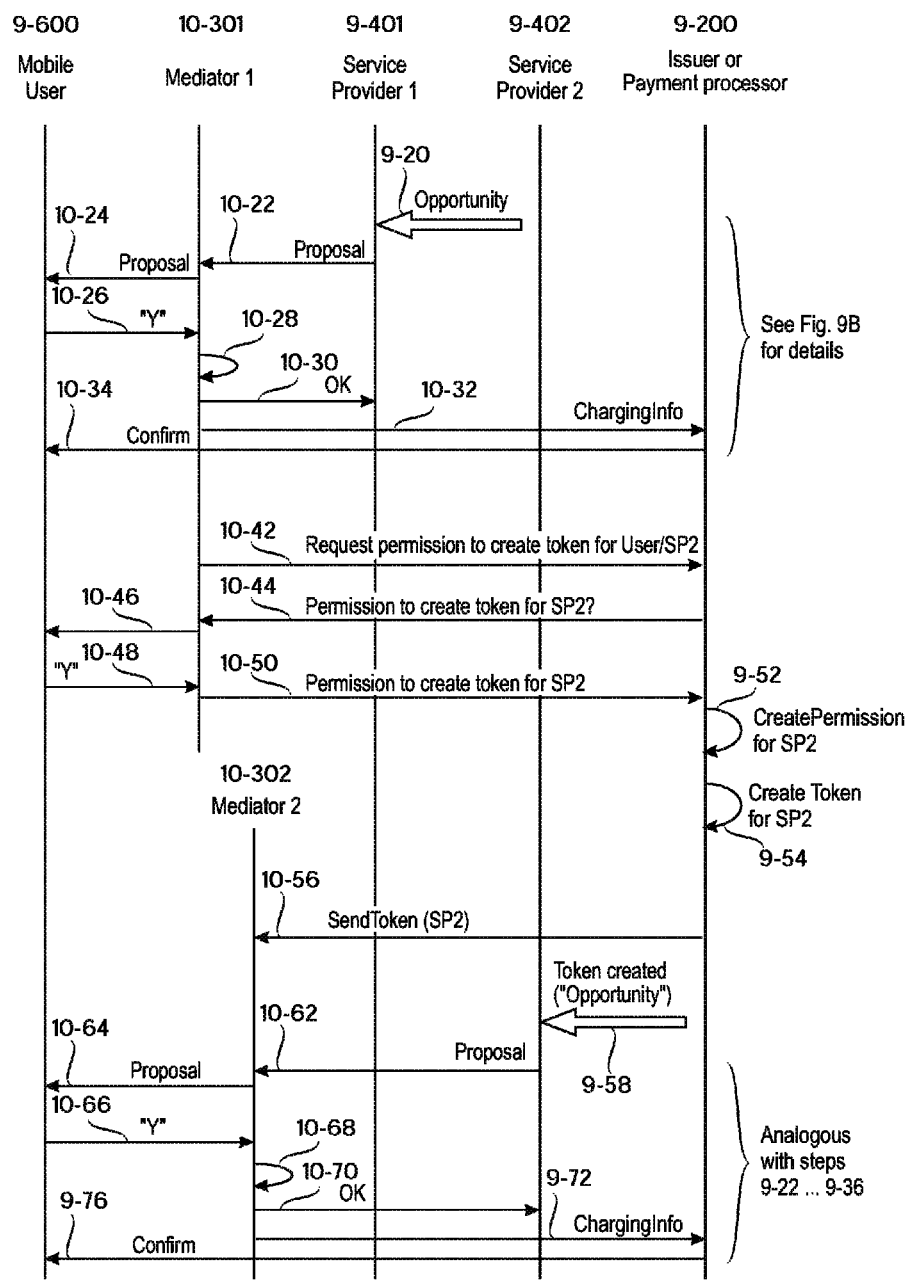

The signaling diagram of FIG. 10D shows a yet further variation from the one shown in FIG. 9C. In the present case, two mediators, denoted by reference numbers 10-301 and 10-302 have been implemented. Each of the two mediators can correspond to the mediators 9-300, 10-300 described earlier. In other words, either mediator or both of them may reside inside or outside the PCI-compliant infrastructure 9-100. The messages and acts 10-xxx performed in FIG. 10D are identical with messages and acts 9-xxx performed in FIG. 9C, apart from the fact that messages and acts up to and including message 10-50 relate to mediator 1, while messages and acts beginning at message 10-50 relate to mediator 2. In the signaling diagram of FIG. 10D, the first mediator 10-301 mediates the process of obtaining the mobile user's permission to create the token for the combination of the user and service provider 2, while the second mediator 10-302 manages the process of obtaining the mobile user's permission to carry out individual transactions.

Now, provided that the two mediators 10-301 and 10-302 are operated by mutually independent operators, the division of tasks between the two mediators makes it easier for the other parties to trust the mediators 10-301 and 10-302. This is because a single fraudulent operator cannot actually benefit from fraudulent operations. Suppose that the operator of the first mediator 10-301 was fraudulent and signaled authorizations for token creation without actually obtaining the mobile user's permission. This kind of fraudulent operation would be detected almost immediately because the confirmations for the individual transactions are mediated by the second mediator, which is operated by a different operator from that of the first mediator. Likewise, the second mediator cannot act fraudulently unless the transaction involves a service provider for whom the mobile user has already authorized recurring payments via the first mediator. What this means is that benefiting from fraudulent behavior requires cooperation from three entities, namely at least one service provider plus the operators of the two mediators.

In addition to the division of mediating task between the two mediators 10-301, 10-302, the issuer/payment processor 9-200 may, at least for some permissions and transactions, bypass one or both the mediators and directly obtain confirmations from the mobile users, as described in connection with FIGS. 10B and 10C.

Certain optional measures may be taken to further reduce the risk of fraudulent behavior. For instance, the token may have a number of restrictions associated with it. The restrictions may apply to the lifetime of the token and/or to the value of financial transactions made by using the token. The lifetime restrictions may be defined in calendar time, such as a validity period terminating on a predefined day, or in number of uses, such as token that can be used for n transactions, wherein n is an integer. Alternatively or additionally, the value of financial transactions made by using the token may be restricted. For instance, any single transaction may be limited to an upper limit or the token may expire as soon as it has been used to execute transactions totaling over a given value. The restrictions associated with the tokens may be enforced by the issuer/payment processor 9-200, the mediator(s) 9-300, 10-301, 10-302, and/or the service providers 9-401, 9-402.

In the following, a number of exemplary use cases will be presented, which utilize the invention and its embodiments. First, an exemplary solution to the service/product trial problem will be disclosed, in the context of a soda vending machine, which was mentioned in the background section of this document. Cash tends to invoke vandalism, caution is required when keeping payment cards visible or distributing payment card data electronically, and it is inconvenient to set up an electronic wallet account solely for the purpose of obtaining a trial product.

An exemplary solution to the service/product trial proceeds as follows:

1. The vending machine is controlled by a vending machine controller. The controller is operable to communicate with clients over a telecommunication network, such as a wireless network, which may be a cellular network. In order to perform the functions of session management and authentication, the controller either includes the functionality of a mediator or cooperates with an external mediator.
2. The vending machine is associated with instructions which instruct the client to send a communication to a telecommunication address of the controller. The instructions can be visible and/or audible in the vicinity of the vending machine. Additionally or alternatively the instructions can be transmitted, multi-casted or broadcasted electronically to the client's mobile terminal, preferably as a result of detecting the client's current or future presence in the vicinity of the vending machine.
3. The client sends a communication, such as an e-mail, SMS message, voice/data call or the like, to the telecommunication address of the controller.
4. The controller detects the address that the client terminal used to send the communication. The client terminal's address can be an e-mail address, a cellular address in the case of a call or SMS message, or any suitable address. The detection of the client terminal's address is a first authentication act, which is relatively weak, because of the fact that sender addresses can be faked.
5. As a result of the first, weak, authentication, the controller performs two acts. It offers the client a trial, which in a typical case may be free of charge. Or the controller may accept any sum the client is willing to pay. In addition to offering the trial, the controller sends the client terminal an offer to set up an account for continuous use of the vending machine. When sending the offer to set up the account, the controller uses some of the previously-described techniques, in which the offer is sent from a randomly-selected varying sender address.
6. The client, assuming that they accept the offer, sends an affirmative reply to the randomly-selected varying sender address (which is the recipient address for the reply message). In some use cases, the client may have to provide more identification details, but in some cases it may suffice that the controller sends the client an identifier of an account, such as a wallet, that the client tops up as necessary. Reception of the affirmative reply by the controller is only possible if the sender of the affirmative reply has received the randomly-selected varying sender address. (In order to increase scalability, the randomly-selected varying sender address are re-used among several clients, but the combination of the randomly-selected varying sender address and the client's address is unique until the sender address is eventually re-used for the same client or client terminal.) Therefore, reception of the affirmative reply from the client's address at the randomly selected address is a second authentication act, which is a stronger mode of authentication than the first authentication. The controller associates the client's address with the client-specific wallet. Those skilled in the art will understand that an e-mail address identifiers the client as a user, while a cellular address identifies the terminal the client is using.
7. After obtaining the necessary account data, such as mobile wallet identifier, the client tops up the wallet using any of available techniques. For instance, money may be transferred to the wallet by using a payment card or payment card data in online transactions. Or, the charge for topping up the wallet may be added to the client's telephone bill, to name but a few examples.
8. When the client wishes to use the wallet to obtain another product from the vending machine, they send a purchase order (communication) to the controller, wherein the purchase order identifies the desired product. The controller detects the address of the client or the terminal, queries a database or wallet server and notes that a wallet has been set up for the client. Let us further assume that the client has topped up the wallet sufficiently to buy the product. In this case the controller instructs the vending machine to deliver the desired product, and price is deducted from the wallet.

In the present context, an electronic wallet, or simply "wallet", means an account in a payment system which receives, stores and transfers electronic equivalent of money. A particular form of an electronic wallet is an online wallet, which supports payments via online terminals, whereby a physical payment card is not needed to effect payments.

Figure 11:
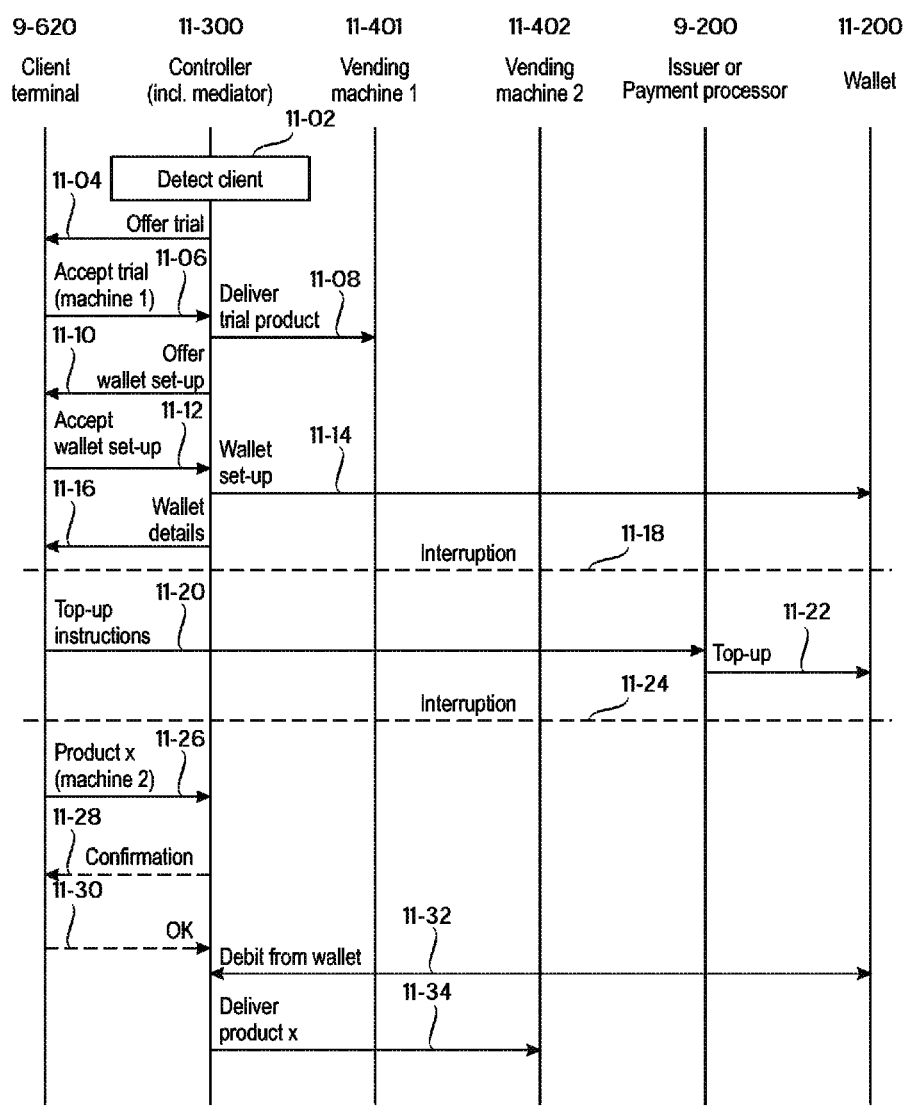
FIGS. 11 and 12 illustrate exemplary processes in which an initial authentication is utilized to deliver a first set of services, followed by progressive levels of authentication before delivery of more expensive services.

FIG. 11 illustrates an example of the above process. In step 11-02 the controller, denoted herein by 11-300, detects the presence of a client with client terminal 9-620. In step 11-04 the controller sends the client terminal 9-620 an offer concerning a trial product. In step 11-06 the controller receives an affirmative reply from the client terminal. In step 11-08 the controller instructs the vending machine 1, denoted by reference number 11-401, to deliver the trial product. In step 11-10 the controller send the client terminal an offer to set up a wallet for facilitating regular use. The offer message 11-10 utilizes random selection of sender address. In step 11-12 the controller receives an affirmative reply from the client terminal's address at the randomly selected address and determines that the client or client terminal has been authenticated at a second level of authentication, which is sufficient for setting up a wallet for the client. In step 11-14 the sets up a wallet, denoted by reference number 11-200. In step 11-16 the controller sends details of the wallet to the client terminal. For purposes of the present example, the details include an account number, reference or other identifier, which a bank or payment processor 9-200 needs to top up the wallet. At this point, the client has accepted and obtained a trial product and accepted setting up a wallet, but the wallet is still empty, unless the vending machine operator provides a nominal initial amount of money. Reference number 11-18 denotes a temporal interruption in the process.

In step 11-20 the client terminal sends instructions to the payment processor. As a result, the payment processor tops up the client's wallet in step 11-22. Reference number 11-24 denotes another temporal interruption.

In step 11-26 the client terminal sends the controller an order for purchasing product x from vending machine 2, denoted by 11-402. In an optional confirmation step 11-28 the controller may send a confirmation request message from another randomly selected address, and if an affirmative reply 11-30 is received from the client terminal at the randomly selected address, it is interpreted as another authentication act. The confirmation step 11-28, 11-30 may be omitted for low-value purchases. In step 11-32 the controller instructs the wallet 11-200 to transfer the price of product x to the account of the vending machine operator. If the debit operation is successful, which means that the wallet existed and had sufficient funds, the controller instructs the vending machine 2, 11-402, to deliver the product x in step 11-34.

As regards the wallet set-up in step 11-14, the wallet can be set up by using any of a number of available techniques. For instance, commonly-owned U.S. patent application Ser. No. 13/514,980, published as 2013/0046656, titled "Method and System for Navigation-free online payment", discloses various techniques for setting up a mobile wallet. By way of example, a mobile wallet can be operated by any of a number of alternative entities, such as: 1) the service provider, which in the present example operates the vending machines, 2) the operator of the mediator, if it is a separate entity from the service provider, 3) a network operator, or 4) a financial institution.

As regards topping up the online wallet, any of a number of available techniques can be used. For instance, said commonly-owned U.S. patent application Ser. No. 13/514,980 and provisional application 61/765,222 disclose some exemplary techniques.

It should be noted that several variations and implementations are possible. For instance, a single controller may control multiple vending machines, in which case the controller has to identify which vending machine the client is using. In one implementation, the vending machines have identifiers, and the client's purchase order identifies the vending machine and the product desired. Alternatively, if the vending machines are sufficiently separated from each other, the right vending machine may be determined from the client's location data in the cellular network. Furthermore, when multiple clients are using a vending machine simultaneously via mobile terminals, it may not be immediately clear which client the machine is currently serving. In order to identify the client being served, the machine may show a part of the client's or terminal's address. Alternatively or additionally, the controller may send a communication to the terminal of the client that is currently served.

As regards the first authentication, it may be based simply on an automatic detection of a communication address used in a message from the client terminal to the controller. By way of example, the communication address may be any of a number of alternatives, such as a mobile identity, e-mail address, a social network identity, or any address or identity by which the client or client terminal can be automatically detected. Although it is relatively easy to fake such identities, the motivation to do so is low because the reward is small, such as a trial product or some other inexpensive service. The method, or equipment carrying out the method, proceeds to one or more stronger levels of authentication before delivering more expensive services and/or more instances of the inexpensive services.

This scenario is applicable to several other fields. Those skilled in the art will understand that the context of a soda vending machine was an illustrative but non-restrictive example. While two levels of authentication was described in the above example, it should be noted that the number of different authentication levels can be higher than two. In one exemplary implementation a third level of authentication can be reached by detecting that the client's wallet has been used and topped up regularly for a period of time and/or number of times that meet some minimum levels. Clients authenticated by the third-level authentication may be able to use their wallets in manners that are not possible after the second level of authentication. For instance, they may be able to buy more valuable products or services. Or, they may have some credit associated with their wallets.

Another example will now be disclosed wherein different products or services are delivered to a client. As the client obtains more expensive services, the level of authentication increases accordingly. In the present example, a first level of authentication is used to provide a client with advisory services that relate to higher-valued services or products. Again, to provide a concrete and understandable example, a detailed use case will be described, wherein the advisory services relate to traveling, such as transportation, hotels or associated services. The example proceeds in the following steps, wherein "operator" refers to a network server, which comprises a computerized data processing and communication equipment operable to communicate with client terminals and to search for and deliver products or services requested by the clients.

1. The client uses a terminal to contact an advisory service, which may offer the services of a human or computerized advisor, or both, depending on the case.
2. Similarly to the preceding vending-machine example, the operator detects the communication address used by the client and uses the detection of the communication address as a first-level authentication, which is a relatively weak mode of authentication.
3. As a result of the first level of authentication, the operator is able to charge a small amount for the advisory services requested by the client. The small amount to be charged can be money that is debited from the client's wall, or charge added to the client's telephone bill. Or, the amount to be charged may be credit points that the client has earned by answering questions from other clients on a forum operated by or related to the advisory service.
4. Assume that a human or computerized advisor has located a travel-related resource, such as a travel ticket or a voucher to a hotel or car rental, that satisfies the client. In order to deliver the resource to the client, the operator needs to perform a second-level authentication of the client. Similarly to the vending-machine example, and earlier examples in this document, the second-level authentication utilizes a randomly selected sender address that is communicated to the client's terminal.
5. The client whose terminal received the communication from the randomly selected sender address is the only one who can send a reply to it. Or, if the randomly selected sender addresses are re-used among multiple client terminals, the client for whom the particular communication was intended, is the only one knowing the right combination of client terminal address and the randomly-selected address. Therefore a reception of a reply from that client terminal address at the randomly-selected address provides a second level of authentication, which is a stronger mode of authentication than the first level of authentication. Again, if e-mail is used as the communication medium, e-mal addresses serve to authenticate clients as persons and not necessarily client terminals.
6. Similarly to the previous examples, payment may be accomplished by using payment cards, online bank authentication, wallets or the like in any combination.

Figure 12:
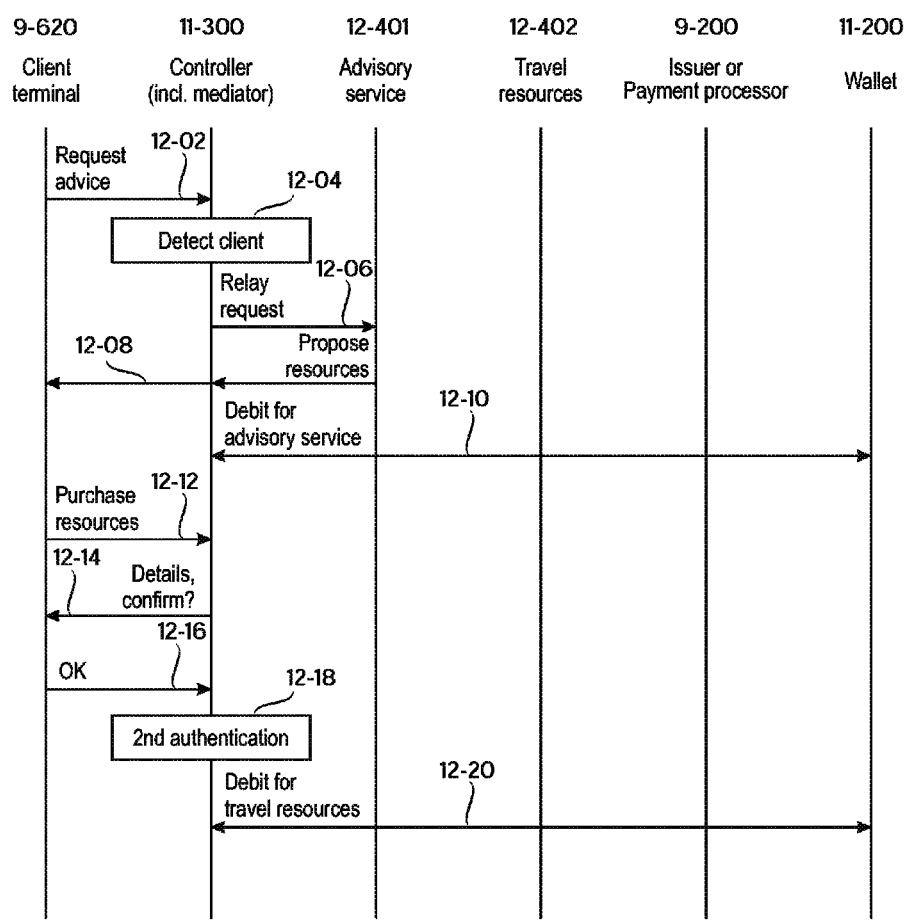

FIG. 12 illustrates an example of the above process. FIG. 12 is based on the assumption that the client using the client terminal 9-620 has set up a wallet 11-200, which has been topped up with sufficient funds for carrying out the process described herein. If the wallet has not been set up or contains insufficient funds, these required actions have been described in connection with FIG. 11.

The illustrated example begins in step 12-02, in which the controller 11-300 receives a request for advisory services concerning travel-related resources, such as tickets, vouchers and/or reservations. In step 12-04 the controller detects the address of the client or client terminal 9-620. This is a first-level authentication. In step 12-06 the controller relays the client's request to the advisory service, denoted by 12-401. In step 12-08 the advisory resource proposes a set of resources to the client. It is self-evident that the communication between the client terminal 9-620 and the advisory service 12-401 may comprise several messages, but only the first and last messages are shown for the sake of clarity and simplicity. FIG. 12 shows an implementation wherein, in step 12-10, the controller utilizes the first-level authentication performed in step 12-04 and instructs the wallet 11-200 to transfer an amount of money for the advisory services to the operator's account. Because the level of authentication is weak at this point, the charge for the advisory services is typically relatively low.

The client has considered the set of resources that the advisory service proposed in step 12-08 and places and order to purchase the proposed resources in step 12-12. In step 12-14, the controller sends identification details of the proposed resources and a confirmation request to the client terminal. The controller again uses a randomly selected sender address to send the confirmation request. In step 12-16 the controller receives an affirmative reply from the address of the client or client terminal at the randomly selected address. As a result of the successful reception of the confirmation, from the client or client terminal address at the randomly selected address, the controller determines, in step 12-18, that the client has been authenticated on a second level, which is a stronger mode of authentication than the first level performed in step 12-04. As a result of the strong second-level authentication, the controller instructs the wallet 11-200 to transfer an amount of money for the travel resources to the operator's account. The operator can then distribute the money to the service providers, such as transport companies, hotels or car rentals. Alternatively, the controller may instruct the wallet to transfer the appropriate amounts of money directly to the accounts of the service providers.

The following is a description of a third example of a method and system wherein progressively increasing levels of authentication are used for delivering services of progressively increasing value to a client. In the present example the service is delivery of digital content from a digital repository, which is called "publisher". In the context of the present example, a product means an identifiable unit of content. By way of example, a unit of content may comprise any combination of a movie or movie episode, video clip, piece of music, program for a computer or smart terminal, an article, a set of photos, a design for a 3-dimensional printer, or the like. The products, ie, identifiable units of content, are accessed and utilized (eg seen, read, heard and/or otherwise utilized) by users. If a user likes a product, they can send a link referring to the product to one or more other users. The link sent from a first user to a second user enables the second user to access the product. This is the traditional way of utilizing links. In addition to using the link for its traditional purpose, the present example utilizes the link from the first user to a second user in one or more of the following additional techniques. Firstly, the act of sending the link by the first user registers the first user as a customer of the publisher, unless the first user has already been registered as a customer. Secondly, the act of sending the link enables the first user to make a donation to the publisher. Thirdly, the act of accessing the product via the link by the second user registers the second user as a customer of the publisher. The fact that the acts of sending and/or activating the link make the first and/or second user customers of the publisher does not necessarily mean that actual monetary transactions are needed at this stage. Indeed, it should be noted that the customers are not necessarily initially identified by their personal identities. Instead, the first-level authentication may be based on identification of a telecommunication address. Such a weak authentication is only sufficient for low-valued transactions. By way of example, fiscal regulators may set an upper limit of, say, 10 euros or dollar, or a comparable sum, for transactions wherein the authentication merely relies on a telecommunication address of the customer's mobile terminal. Assuming that the customer makes a donation of 10 cents, they can make 100 donations until the upper limit is reached. In a slightly different implementation, the publisher may give an initial credit worth one or a few euros or dollars to each new customer. When the cumulative donations have exhausted the initial credit, the publisher may propose a wallet to the customer, and assuming the customer accepts, a wallet is set up for future donations. The procedure for setting up the wallet can be similar to the one disclosed in FIG. 11, wherein the "controller/mediator" of FIG. 11 corresponds to the publisher and mediator of the present example.

Figure 13:
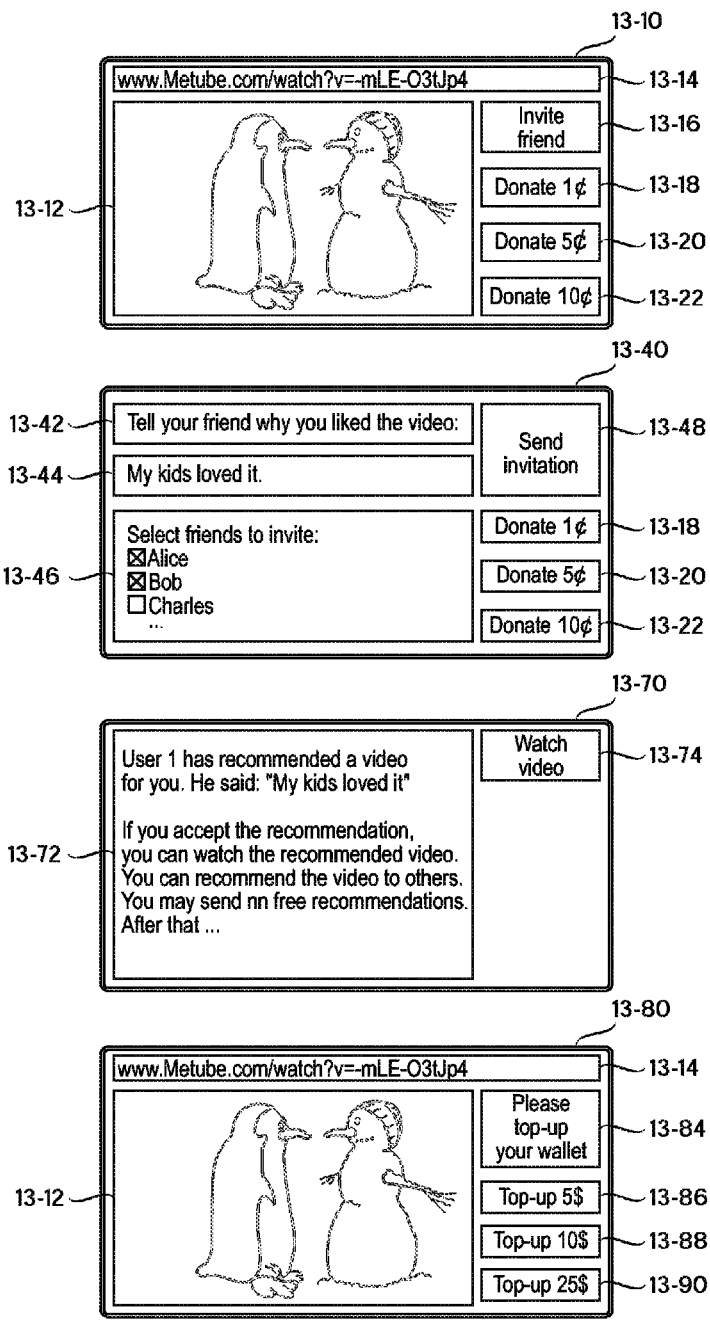
FIG. 13 shows a set of user interface screens that illustrate various user interface screens by which users can access digital content published online and send recommendations to others.

FIG. 13 shows a set of user interface screens that illustrate the present example. Reference number 13-10 denotes a user interface screen when User 1 is watching a video. Reference number 13-12 denotes a window in which the video is shown and reference number 13-14 denotes an optional network identifier of the video, such as a network address, which may be followed by search parameters. For the users, it is not absolutely necessary to know the network identifier, because the video may be located by keywords, for example. Alternatively the video may be selected automatically based on user-specific parameters. For the case that user 1 likes the video and decides to recommend it to friends, the user interface screen 13-10 comprises a number of additional user interface elements. One of these additional elements is a button 13-16 by which the user can invite friends to watch the video. For the case that the user likes the video but does not wish to anyone, the user interface screen comprises a set of elements for donating an amount of money to the publisher. In the present example, the user interface elements has three buttons 13-18, 13-20 and 13-22 for choosing a donation of 1, 5 or 10 cents, respectively. Instead of a number of predetermined amounts, or in addition to them, there may be a user interface element for selecting an arbitrary amount. The predetermined amounts, such as 1, 5 or 10 cents, may depend on the nature and/or amount of content. For instance, the publisher may set a minimum amount, such as 1 or 10 cents, and the other user-selectable amounts may be multiples of the minimum amount.

Assuming that user 1 presses the "Invite friend" button 13-16, they see a second screen, denoted by 13-40. By way of example, the second screen comprises a query field 13-42 and a response field 13-44, by which the user can tell why they recommend the video. The next window pane 13-46 is for selecting friends to invite. The friends can be selected from the terminal's address book or a database managed by the publisher (content provider), or by the e-mail operator, to name but a few possible examples. In the present example, the second screen also comprises a number of buttons 13-18, 13-20 and 13-22 for choosing donation of different sizes. Other implementations exist, however. In another implementation, the act of sending invitations, via button 13-48, may invoke a fixed price to the publisher.

Reference number 13-70 shows the user interface screen of a second user to whom the first user sent an invitation. In the present example, text element 13-72 tells user 2 that user 1 has recommended a video, and the reasons for user 1 to recommend it. The user interface screen 13-70 may also display the terms under which user 2 is able to watch the video. If user 2 accepts the terms, they may watch the video by clicking on button 13-74.

Finally, reference number 13-80 denotes a user interface screen for the case when a user's wallet contains insufficient funds to make a donation or to send a link. User interface element 13-84 informs the user that their wallet needs topping up, while reference numbers 13-86, 13-88 and 13-90 denote three buttons for selecting one of three predetermined amounts for topping up the wallet. A detailed example for setting up and topping up a wallet was described in connection with FIG. 11.

It should be noted that the three use cases described in connection with FIGS. 11, 12, and 13 are intended to provide concrete examples, and the invention is not limited to these examples. While the examples of FIGS. 11 and 12 are shown as signaling diagrams and the one shown in FIG. 13 via user interface elements, those skilled in the art will understand that various features of the examples can be combined in manners not explicitly shown in the text or drawings.

FIG. 14 schematically shows an exemplary block diagram for the various information processing and/or mediating servers in the systems described earlier. For instance, such a server architecture, generally denoted by reference numeral 14-100, can be used to implement the mediators 100 and/or the servers for the service-specific systems 122, an example of which is the booking system 102. The two major functional blocks of the database server system SS are a server computer 14-100 and a storage system 14-190. The server computer 14-100 comprises one or more central processing units CP1 . . . CPn, generally denoted by reference numeral 14-110. Embodiments comprising multiple processing units 14-110 are preferably provided with a load balancing unit 14-115 that balances processing load among the multiple processing units 14-110. The multiple processing units 14-110 may be implemented as separate processor components or as physical processor cores or virtual processors within a single component case. The server computer 14-100 further comprises a network interface 14-120 for communicating with various data networks, which are generally denoted by reference sign DN. The data networks DN may include local-area networks, such as an Ethernet network, and/or wide-area networks, such as the internet. Assuming that the server computer 14-100 acts as a mediator 100, it may serve one or more service-specific systems 122 via the data networks DN. Reference numeral 14-125 denotes a mobile network interface, through which the server computer 14-100 may communicate with various access networks AN, which in turn serve the mobile terminals MT used by end users or clients.

The server computer 14-100 of the present embodiment may also comprise a local user interface 14-140. Depending on implementation, the user inters face 14-140 may comprise local input-output circuitry for a local user interface, such as a keyboard, mouse and display (not shown). Alternatively or additionally, management of the server computer 14-100 may be implemented remotely, by utilizing the network interface 14-120 and any internet-enabled terminal that provides a user interface. The nature of the user interface depends on which kind of computer is used to implement the server computer 14-100. If the server computer 14-100 is a dedicated computer, it may not need a local user interface, and the server computer 14-100 may be managed remotely, such as from a web browser over the internet, for example. Such remote management may be accomplished via the same network interface 14-120 that the server computer utilizes for traffic between itself and the client terminals.

The server computer 14-100 also comprises memory 14-150 for storing program instructions, operating parameters and variables. Reference numeral 14-160 denotes a program suite for the server computer 14-100.

The server computer 14-100 also comprises circuitry for various clocks, interrupts and the like, and these are generally depicted by reference numeral 14-130. The server computer 14-100 further comprises a storage interface 14-145 to the storage system 14-190. When the server computer 14-100 is switched off, the storage system 14-190 may store the software that implements the processing functions, and on power-up, the software is read into semiconductor memory 14-150. The storage system 14-190 also retains operating and variables over power-off periods. In large-volume implementations, that is, implementations wherein a single server computer 14-100 serves a large number of clients via respective mobile terminals MT, the storage system 14-190 may be used to store the dynamic dialog matrices associated with the clients and mobile terminals MT. The various elements 14-110 through 14-150 intercommunicate via a bus 14-105, which carries address signals, data signals and control signals, as is well known to those skilled in the art.

The inventive techniques may be implemented in the server computer 14-100 as follows. The program suite 14-160 comprises program code instructions for instructing the set of processors 14-110 to execute the functions of the inventive method, wherein the functions include performing the service provisioning and/or mediator features according to the invention and/or its embodiments.

The invention claimed is:

1. A method comprising:
    performing following acts on a network server:
    receiving a communication from a mobile terminal operated by a client;
    performing a first authentication of the mobile terminal and/or the client;
    in response to the first authentication being successful, delivering a first service to the client;
    after delivering the first service to the client, sending an offer for a second service to the mobile terminal;
    receiving an acceptance message for the second service from the mobile terminal;
    performing a second authentication of the mobile terminal and/or the client;
    in response to receiving the acceptance message for the second service from the mobile terminal and to the second authentication being successful, delivering the second service to the client;
    wherein the first authentication and the second authentication use different authentication techniques;
    wherein the second authentication comprise:
    randomly selecting one of a finite number of telecommunication addresses by which the network server is accessible;
    using the randomly selected telecommunication address in an offer message from the network server to the mobile terminal;
    authenticating the mobile terminal and/or the client if a reply message to the offer message is received from the mobile terminal at the randomly selected telecommunication address.

2. The method according to claim 1, wherein the first authentication and the second authentication utilize automatic detection of one or more telecommunication addresses used in communication between the network server and the mobile terminal.

3. The method according to claim 2, wherein the telecommunication addresses are selected from a list that comprise a terminal identifier in a mobile cellular network, an e-mail address and a social network identity.

4. The method according to claim 1, wherein the second service comprises setting up an online wallet for the client, and wherein the network server receives instructions to debit the online wallet for future services to the client.

5. The method according to claim 1, wherein the second service comprises products delivered from one or more vending machines, and wherein the first service comprises a limited number of one or more products delivered from the one or more vending machines.

6. The method according to claim 5, wherein the limited number is not more than 10.

7. The method according to claim 1, wherein the second service comprises resources needed for transportation and/or accommodation, and wherein the first service comprises one or more advisory services related to the needed resources.

8. The method according to claim 1, wherein the second service differs from the first service with respect to one or more of nature, quantity, unit value, method of payment, service provider, time of delivery, method of delivery, and user.

9. A method comprising:
performing following acts on a network server:
receiving a communication from a mobile terminal operated by a client;
performing a first authentication of the mobile terminal and/or the client;
in response to the first authentication being successful, delivering a first service to the client;
after delivering the first service to the client, sending an offer for a second service to the mobile terminal;
receiving an acceptance message for the second service from the mobile terminal;
performing a second authentication of the mobile terminal and/or the client;
in response to receiving the acceptance message for the second service from the mobile terminal and to the second authentication being successful, delivering a second service to the client;
wherein the first authentication and the second authentication use different authentication techniques,
wherein the second service comprises content delivered from an online content repository, and
wherein the content delivered from an online content repository is associated with user interface elements for recommending the delivered content to other users.

10. The method according to claim 9, wherein the second service differs from the first service with respect to one or more of nature, quantity, unit value, method of payment, service provider, time of delivery, method of delivery, and user.

11. A method comprising:
performing following acts on a network server:
receiving a communication from a mobile terminal operated by a client;
performing a first authentication of the mobile terminal and/or the client;
in response to the first authentication being successful, delivering a first service to the client;
after delivering the first service to the client, sending an offer for a second service to the mobile terminal;
receiving an acceptance message for the second service from the mobile terminal;
performing a second authentication of the mobile terminal and/or the client;
in response to receiving the acceptance message for the second service from the mobile terminal and to the second authentication being successful, delivering a second service to the client;
wherein the first authentication and the second authentication use different authentication techniques, wherein the second service comprises content delivered from an online content repository, and
wherein the content delivered from an online content repository is associated with user interface elements for making a user-selectable donation to a publisher of the delivered content.

12. The method according to claim 11, wherein the second service differs from the first service with respect to one or more of nature, quantity, unit value, method of payment, service provider, time of delivery, method of delivery, and user.

13. A data processing system comprising:
a memory system that stores program code instructions and data;
a processing system including at least one processing unit, wherein the processing system executes at least a portion of the program code instructions and processes the data;
a set of network interfaces for acting as a node and for communicating with other nodes in one or more telecommunication networks;
wherein the memory system comprises program code instructions executable by the processing system, wherein execution of the program code instructions causes the processing system to:
receive a communication from a mobile terminal operated by a client;
perform a first authentication of the mobile terminal and/or the client;
in response to the first authentication being successful, deliver a first service to the client;
after delivering the first service to the client, send an offer for a second service to the mobile terminal;
receive an acceptance message for the second service from the mobile terminal;
perform a second authentication of the mobile terminal and/or the client;
in response to receiving the acceptance message for the second service from the mobile terminal and to the second authentication being successful, deliver a second service to the client;
wherein the first authentication and the second authentication use different authentication techniques;
wherein the second authentication comprises:
randomly selecting one of a finite number of telecommunication addresses by which the network server is accessible;
using the randomly selected telecommunication address in an offer message from the network server to the mobile terminal;
authenticating the mobile terminal and/or the client if a reply message to the offer message is received from the mobile terminal at the randomly selected telecommunication address.

14. The data processing system according to claim 12, wherein the first authentication and the second authentication utilize automatic detection of one or more telecommunication addresses used in communication between the network server and the mobile terminal.

15. The data processing system according to claim 14, wherein the telecommunication addresses are selected from a list that comprise a terminal identifier in a mobile cellular network, an e-mail address and a social network identity.

16. The data processing system according to claim 13, wherein the second service comprises setting up an online wallet for the client, and wherein the network server receives instructions to debit the online wallet for future services to the client.

17. The data processing system according to claim 13, wherein the second service comprises products delivered from one or more vending machines, and wherein the first service comprises a limited number of one or more products delivered from the one or more vending machines.

18. The data processing system according to claim 17, wherein the limited number is not more than 10.

19. The data processing system according to claim 13, wherein the second service comprises resources needed for transportation and/or accommodation, and wherein the first service comprises one or more advisory services related to the needed resources.

20. The data processing system according to claim 13, wherein the second service differs from the first service with respect to one or more of nature, quantity, unit value, method of payment, service provider, time of delivery, method of delivery, and user.

21. A data processing system comprising:
a memory system that stores program code instructions and data;
a processing system including at least one processing unit, wherein the processing system executes at least a portion of the program code instructions and processes the data;
a set of network interface for acting as a node and for communicating with other nodes in one or more telecommunication networks;
wherein the memory system comprises program code instructions executable by the processing system, wherein execution of the program code instructions causes the processing system to:
receive a communication from a mobile terminal operated by a client;
perform a first authentication of the mobile terminal and/or the client;
in response to the first authentication being successful, deliver a first service to the client;
after delivering the first service to the client, send an offer for a second service to the mobile terminal;
receive an acceptance message for the second service from the mobile terminal;
perform a second authentication of the mobile terminal and/or the client;
in response to receiving the acceptance message for the second service from the mobile terminal and to the second authentication being successful, deliver a second service to the client;
wherein the first authentication and the second authentication use different authentication techniques; and
wherein the content delivered from an online content repository is associated with user interface elements for recommending the delivered content to other users.

22. The data processing system according to claim 21, wherein the second service differs from the first service with respect to one or more of nature, quantity, unit value, method of payment, service provider, time of delivery, method of delivery, and user.

23. A data processing system comprising:
a memory system that stores program code instructions and data;
a processing system including at least one processing unit, wherein the processing system executes at least a portion of the program code instructions and processes the data;
a set of network interfaces for acting as a node and for communicating with other nodes in one or more telecommunication networks;
wherein the memory system comprises program code instructions executable by the processing system, wherein execution of the program code instructions causes the processing system to:
receive a communication from a mobile terminal operated by a client;
perform a first authentication of the mobile terminal and/or the client;
in response to the first authentication being successful, deliver a first service to the client;
after delivering the first service to the client, send an offer for a second service to the mobile terminal;
receive an acceptance message for the second service from the mobile terminal;
perform a second authentication of the mobile terminal and/or the client;
in response to receiving the acceptance message for the second service from the mobile terminal and to the second authentication being successful, deliver a second service to the client;
wherein the first authentication and the second authentication use different authentication techniques wherein the second service comprises content delivered from an online content repository; and
wherein the content delivered from an online content repository is associated with user interface elements for making a user-selectable donation to a publisher of the delivered content.

24. The data processing system according to claim 23, wherein the second service differs from the first service with respect to one or more of nature, quantity, unit value, method of payment, service provider, time of delivery, method of delivery, and user.

25. A non-transitory computer program embodying computer program instructions for instructing an electronic data processing system acting as a network server to carry out the acts recited in claim 1.

* * * * *